United States Patent
di Proietto et al.

(10) Patent No.: US 10,243,793 B1
(45) Date of Patent: Mar. 26, 2019

(54) MODULAR SYSTEM FRAMEWORK FOR SOFTWARE NETWORK FUNCTION AUTOMATION

(71) Applicant: Nefeli Networks, Inc., Berkeley, CA (US)

(72) Inventors: Daniele di Proietto, San Francisco, CA (US); Aurojit Panda, New York, NY (US); Melvin Walls, Berkeley, CA (US); Nicholas Sun, Oakland, CA (US); Barath Raghavan, Los Angeles, CA (US); Sylvia Ratnasamy, Berkeley, CA (US)

(73) Assignee: Nefeli Networks, Inc., Berkeley, CA (US)

( * ) Notice: Subject to any disclaimer, the term of this patent is extended or adjusted under 35 U.S.C. 154(b) by 0 days.

(21) Appl. No.: 16/102,375

(22) Filed: Aug. 13, 2018

(51) Int. Cl.
*G06F 9/455* (2018.01)
*H04L 12/24* (2006.01)

(52) U.S. Cl.
CPC .......... *H04L 41/0816* (2013.01); *G06F 9/455* (2013.01)

(58) Field of Classification Search
CPC . G06F 8/35; G06F 8/41; H04L 45/306; H04L 45/38
See application file for complete search history.

(56) References Cited

U.S. PATENT DOCUMENTS

| | | | | |
|---|---|---|---|---|
| 9,413,655 B2 * | 8/2016 | Shatzkamer | ............ | H04L 45/74 |
| 9,436,443 B2 * | 9/2016 | Chiosi | ............ | G06F 8/35 |
| 2014/0040975 A1 * | 2/2014 | Raleigh | ............ | H04W 12/12 726/1 |
| 2014/0229945 A1 * | 8/2014 | Barkai | ............ | H04L 49/70 718/1 |
| 2015/0195197 A1 * | 7/2015 | Yong | ............ | H04L 45/74 370/392 |
| 2015/0365322 A1 * | 12/2015 | Shatzkamer | ............ | H04L 45/74 370/392 |
| 2016/0062746 A1 * | 3/2016 | Chiosi | ............ | G06F 8/35 717/104 |
| 2016/0156513 A1 * | 6/2016 | Zhang | ............ | H04W 4/70 709/220 |

(Continued)

OTHER PUBLICATIONS

Palkar, et al., E2: A Framework for NFV Applications, ACM SOSP 2009, 16 pages.

(Continued)

*Primary Examiner* — Ranodhi Serrao
(74) *Attorney, Agent, or Firm* — The Mueller Law Office, P.C.

(57) ABSTRACT

A method for automating network function virtualization (NFV) using a modular NFV framework involves subscribing, by a control module of a network, to a key of a state store of the network. The state store includes stored data objects and unique keys. Each of the stored data objects is associated with one of the unique keys. The key is one of the unique keys. A notification is received at the control module from the state store. The notification is associated with the key. The control module reads a data object, associated with the key, from the stored data objects in the state store in response to the notification, and the control module modifies a network traffic flow of the network through two or more software network functions of the network based on the data object.

27 Claims, 13 Drawing Sheets

(56) References Cited

U.S. PATENT DOCUMENTS

| | | | | |
|---|---|---|---|---|
| 2016/0205005 A1* | 7/2016 | Lee | .................... | H04L 41/5025 |
| | | | | 709/224 |
| 2016/0226913 A1* | 8/2016 | Sood | ....................... | H04L 63/20 |
| 2016/0261495 A1* | 9/2016 | Xia | ........................ | H04L 45/58 |
| 2016/0352924 A1* | 12/2016 | Senarath | ........... | H04M 15/8016 |
| 2016/0371063 A1* | 12/2016 | Chiosi | ...................... | G06F 8/35 |
| 2016/0373474 A1* | 12/2016 | Sood | ................... | H04L 63/1425 |
| 2017/0005947 A1* | 1/2017 | Chu | ........................ | H04L 45/24 |

OTHER PUBLICATIONS

Rodriguez-Natal, et al., Global State, Local Decisions: Decentralized NFV for ISPs via enhanced SDN, Article in IEEE Communications Magazine, Apr. 2017, 8 pages.

Soenen et al., Optimising Microservice-based Reliable NFV Management & Orchestration Architectures, 2017 9th International Workshop on Resilient Network Design and Modeling (RNDM), Sep. 4-6, 2017. 7 pages.

* cited by examiner

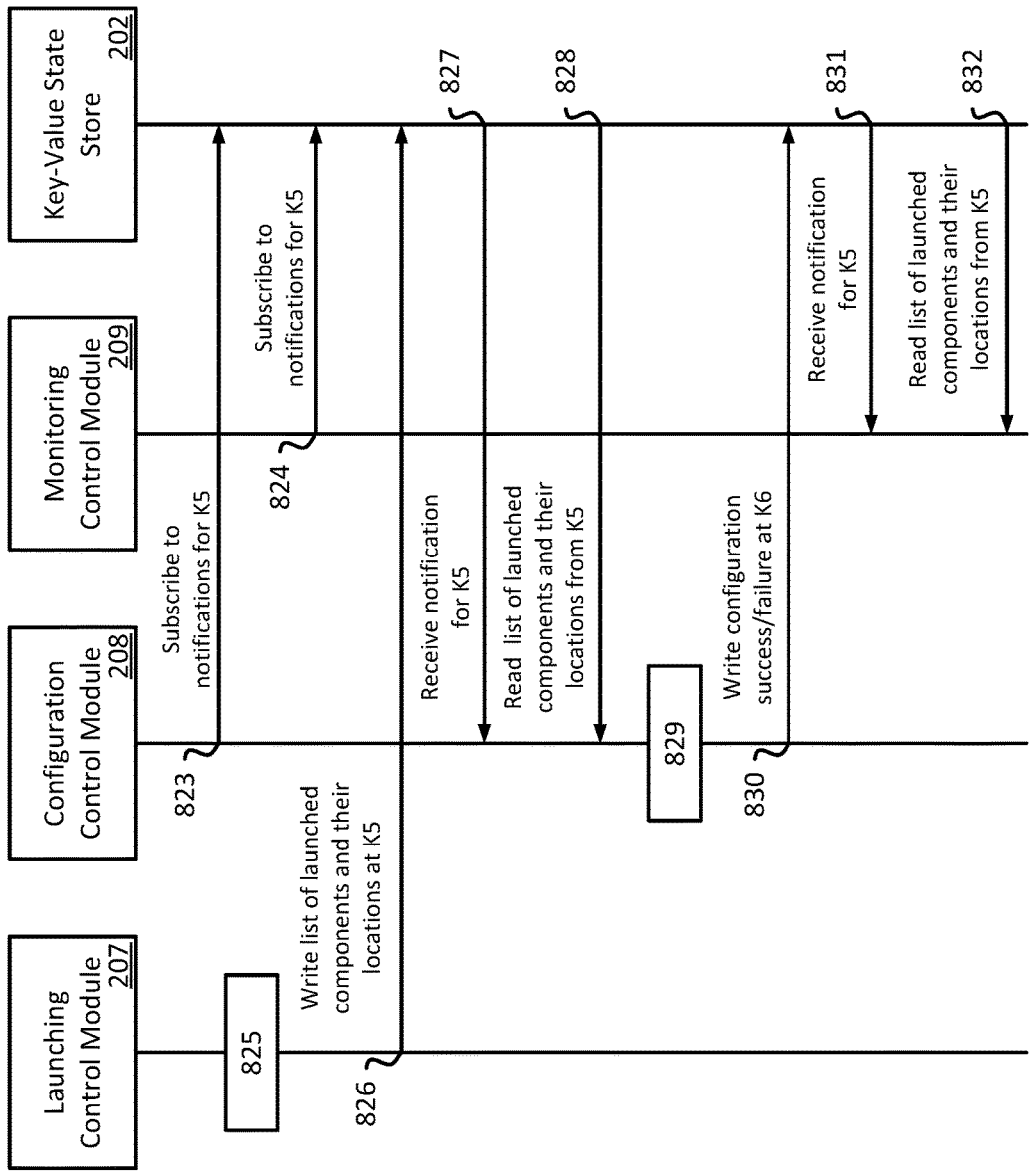

MODULAR SYSTEM FRAMEWORK FOR SOFTWARE NETWORK FUNCTION AUTOMATION

BACKGROUND

Software network functions (NFs) are software applications that implement advanced traffic processing functions; i.e., inspecting, modifying, or otherwise processing the packets in a network traffic stream. Examples of NFs include network intrusion detection systems (IDS), protocol or WAN optimizers, firewalls, Network Address Translators (NATs), and so forth. Within a network, different traffic streams may be processed by different network function virtualization (NFV) services. An NFV service can include a single NF, or a chained sequence of NFs. In a typical scenario, a network operator will define how different traffic streams should be processed by an NFV service using a high-level abstraction—e.g., using an abstract modeling language such as TOSCA (Topology and Orchestration Specification for Cloud Applications) or a graphical user interface (GUI). This high-level specification, referred to as a network function virtualization (NFV) policy graph, is an NFV policy specification which defines how traffic should be processed by different NFs of an NFV service and may be applied to all traffic to/from a particular customer or tenant of a network. Additionally, the NFV policy specification may optionally include constraints such as target performance levels (min and/or max) of the NFs or other components of the network. Many steps are involved in executing an NFV policy specification such as described above. For example, a set of resources (e.g., CPU cores, memory) must be allocated to run the required NFs; the appropriate NF images (e.g., virtual machines (VMs), containers, or processes) must be launched and configured; relevant network elements must be configured to correctly steer traffic through the correct sequence of NFs of the NFV service as specified by the NFV policy specification, and so forth. These steps are required for initially setting up an NFV deployment in accordance with the NFV policy specification. Additional steps are also required to maintain the operation of this deployment: e.g., adjusting the number of NF instances as the traffic load changes, detecting and recovering from failure, and so forth.

Conventional systems for deploying and maintaining NFs within a network are typically either implemented as monolithic software entities or are implemented as tightly coupled modules which communicate via pairwise application programming interfaces (APIs). Conventional systems implemented as monolithic software entities are often hard to extend and maintain because developers of such systems have to understand the entire system in order to test or modify it. Conventional systems which are implemented as tightly coupled modules which communicate via pairwise APIs are often hard to extend or modify because changing a workflow of such systems requires modifying the pairwise APIs, which often then requires modules of the system to be changed to support the modified APIs. Conventional systems that use pairwise APIs are also vulnerable to "lock-in" because replacing a module of the system with a module offered from another vendor often requires also replacing every module of the system that used the replaced module. Additionally, modules of conventional systems often hold system state internally, which complicates the architecting of resilient systems. For instance, in conventional systems, multiple instances of the same module will typically be instantiated within the network, and those instances perform a computationally heavy state replication and consensus algorithm between themselves.

SUMMARY

In some embodiments, a method for automating network function virtualization (NFV) using a modular NFV framework involves subscribing, by a control module of a network, to a key of a state store of the network. The state store includes one or more stored data objects and one or more unique keys. Each of the stored data objects is associated with one of the one or more unique keys. The key is one of the one or more unique keys. A notification associated with the key is received at the control module from the state store. The control module reads a data object, associated with the key, from the one or more stored data objects in the state store in response to the notification, and the control module modifies a network traffic flow of the network through one or more software network functions of the network based on the data object.

In some embodiments, a method for automating network function virtualization (NFV) using a modular NFV framework involves providing two or more control modules and a state store within a network. The state store includes one or more stored data objects and one or more unique keys. Each of the stored data objects is associated with one of the unique keys. A first network function virtualization (NFV) policy specification is received at a first control module of the two or more control modules. A second control module of the two or more control modules subscribes to a first key of the one or more unique keys. The first control module generates a second NFV policy specification using the first NFV policy specification and writes a first data object to the state store, the first data object including the second NFV policy specification. The first data object is stored in the state store in association with the first key. A first notification associated with the first key is generated in response to the first data object being written to the state store, and the first data object is read from the state store by the second control module in response to the first notification.

BRIEF DESCRIPTION OF THE DRAWINGS

FIGS. 8A-D are a simplified example workflow of a modular NFV framework, in accordance with some embodiments.

DETAILED DESCRIPTION

Figure 1:
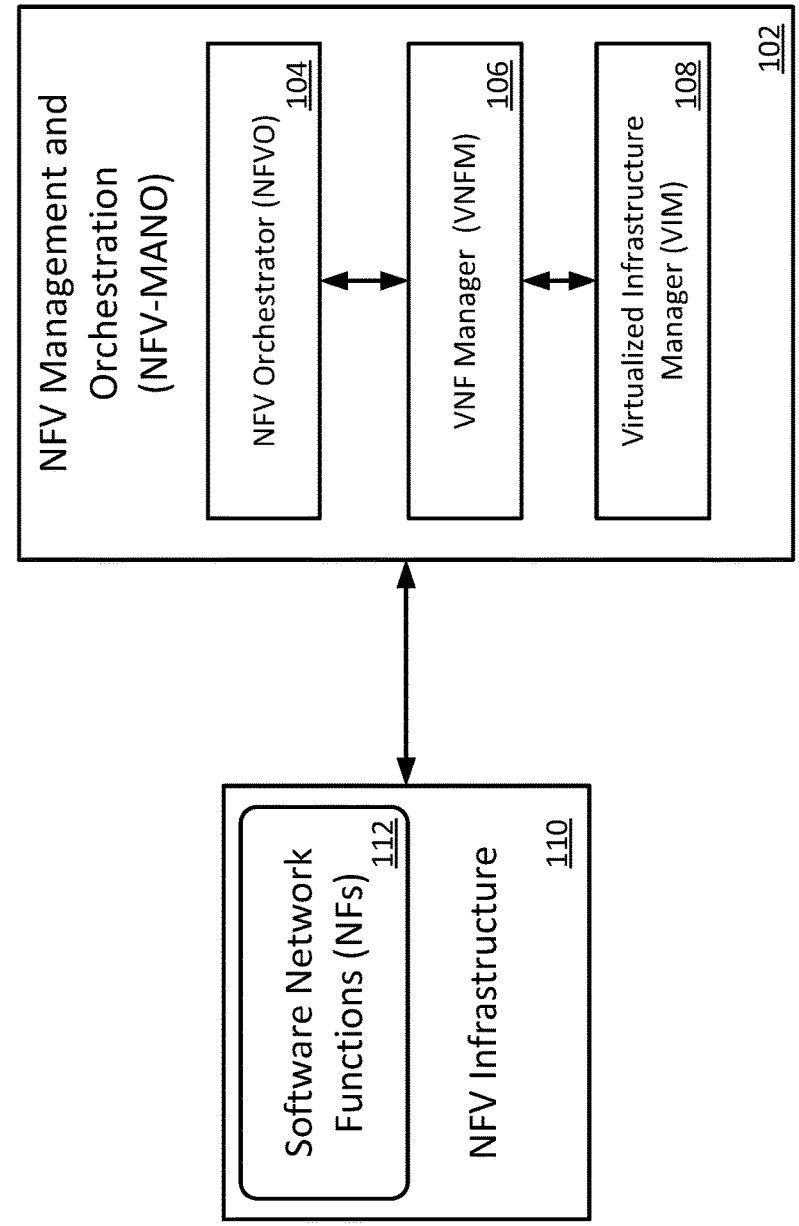
FIG. 1 is a simplified view of a conventional architecture for software network function virtualization (NFV).

Embodiments of systems and methods for automating and modularizing the design, deployment, and maintenance of software network function (NF) deployments for network function virtualization (NFV) are described herein. A deployed NF or network component is an NF or network component that has been provisioned, instantiated, installed, executed, enabled, or otherwise been caused to be running in the network. This modular, decoupled framework for software network function automation advantageously decomposes each step of NFV design, deployment, and maintenance into a set of separate control modules, which each store and receive network state data to and from a highly available centralized key-value state store. In some embodiments, the network state data includes NFV policy specifications. An NFV policy specification is, or includes, one or more of an instruction, a graph, a policy description, a status, a network state, or a configuration. Examples of NFV policy specifications described herein include logical NFV policy specifications, sized NFV policy specifications, placed NFV policy specifications, and chained NFV policy specifications. Other examples of NFV policy specifications described herein include states, lists, statuses, descriptions, commands, and other data objects. Because network states and other states used by the control modules are stored at the key-value state store, a particular control module can advantageously be reset or entirely replaced without losing state, thereby preserving the state of the framework across a failure.

The control modules communicate and coordinate between one another via the key-value state store rather than through a pairwise API. Control modules read data objects from the key-value state store, write data objects to the key-value state store, and/or watch key-value entries of the key-value state store. Watching a key-value entry of the key-value state store involves subscribing to keys, or key prefixes of a set of keys, of the key-value state store which are related to functions that the subscribing control modules perform. By coordinating in this fashion, the control modules described herein can implement the various steps needed to execute new NFV policies as well as auto-scale or automate failure recovery in existing NFV policies. In this communication paradigm, the key-value state store emits notifications associated with a unique key when data is stored in association with that key. A notification received by a subscribing control module indicates to the subscribing control module that relevant data within the key-value state has been written, deleted, or modified. In some embodiments, a data portion of a notification identifies the unique key. In other embodiments, the data portion of a notification identifies a prefix of a set of unique keys. Thus, control modules subscribing to that unique key, or subscribing to the prefix for the set of unique keys, will receive a notification when the data associated with the key is stored or otherwise updated and can then retrieve the data associated with that key from the key-value state store. Control modules can read data objects from, and write data objects to, the key-value state store without having first received a notification, for example at start-up or re-initialization of a control module. Thus, new or previously existing control modules which can utilize existing data stored in the key-value state-store may be added to the framework without the knowledge or cooperation of the other control modules. This communication paradigm advantageously allows developers or network administrators to extend or change the functionality of the framework without necessarily modifying, or even having cooperation from, other control modules, and advantageously without having to modify an API. Additionally, this communication paradigm allows for modularization of testing (which can greatly reduce the effort required to test the framework), and facilitates system integration efforts.

In some embodiments, the modular NFV framework advantageously enables more than one instance of a particular control module to be added to the framework, to extend the functionality of a control module, to replace one control module with another (e.g., replacing the placement control module with one that implements a new placement policy), to insert a new control module into the automation process (e.g., an analytics control module that processes performance metrics to predict faults), or even to have different control modules for different network function virtualization (NFV) services. For example, one placement control module could be used for one set of NFV services, and a second placement control module could be used for the remaining NFV services. An NFV service generally includes a set of network components, such as a set of serially chained NFs, where an output of one network component in the series is an input to a next network component in the series. Examples of an NFV service included, but are not limited to, a software network function service, a network function processing pipeline, and a service chain of NFs.

Such extensibility is achieved by the modular NFV framework because: (i) the automation task is decomposed into a set of independent subtasks, and (ii) the subtasks are implemented as standalone control modules that coordinate only through the key-value state store, which provides a level of indirection between the control modules (as opposed to software modules that coordinate directly with each other through pairwise APIs).

Thus, this modular NFV framework is general (i.e., applicable to a wide range of NFs), extensible (allowing for future evolution), scalable (i.e., to large numbers of policies and high volumes of traffic), and resilient (i.e., with no single point of failure).

These advantages are in contrast to conventional systems for deploying and maintaining NFs within a network, which are typically either monolithic software entities or are implemented as tightly coupled modules which communicate via pairwise API's.

FIG. 1 illustrates a conventional architecture 100 for network function virtualization (NFV) within a network. Some elements which are understood by one of skill in the art to be present have been omitted from FIG. 1 to simplify the description. The architecture 100 generally includes an NFV management and orchestration module (NFV-MANO) 102, which includes an NFV Orchestrator module (NFVO) 104, a Virtualized Network Function (VNF) Manager module (VNFM) 106, and a Virtualized Infrastructure Manager (VIM) module 108. The NFV-MANO 102 is in communication with NFV Infrastructure 110 (e.g., a network having one or more compute nodes) in which one or more software network functions (NFs) 112 are deployed. The NFV-MANO 102 is responsible for executing an NFV policy, steps of which may include identifying or allocating a set of resources (e.g., CPU cores, memory) within the NFV infrastructure 110 (e.g., a network) to run the NFs 112; determining an appropriate set of NFs 112 to run, and deploying and configuring appropriate contexts for the NFs 112 to run (e.g., virtual machines (VMs), containers, or processes). Additionally, the NFV-MANO 102 performs the steps of configuring relevant network elements of the NFV infrastructure 110 which must be configured to correctly steer traffic through the correct sequence of the NFs 112 as specified by an NFV policy. These steps are often required for initially setting up an NFV deployment within the NFV infrastructure 110 in accordance with the NFV policy. Additional steps are also undertaken by the NFV-MANO 102 to maintain the operation of the NF 112 deployment: e.g., adjusting the number of NF 112 instances as the traffic load changes, detecting and recovering from failure, and so forth.

Figure 2:
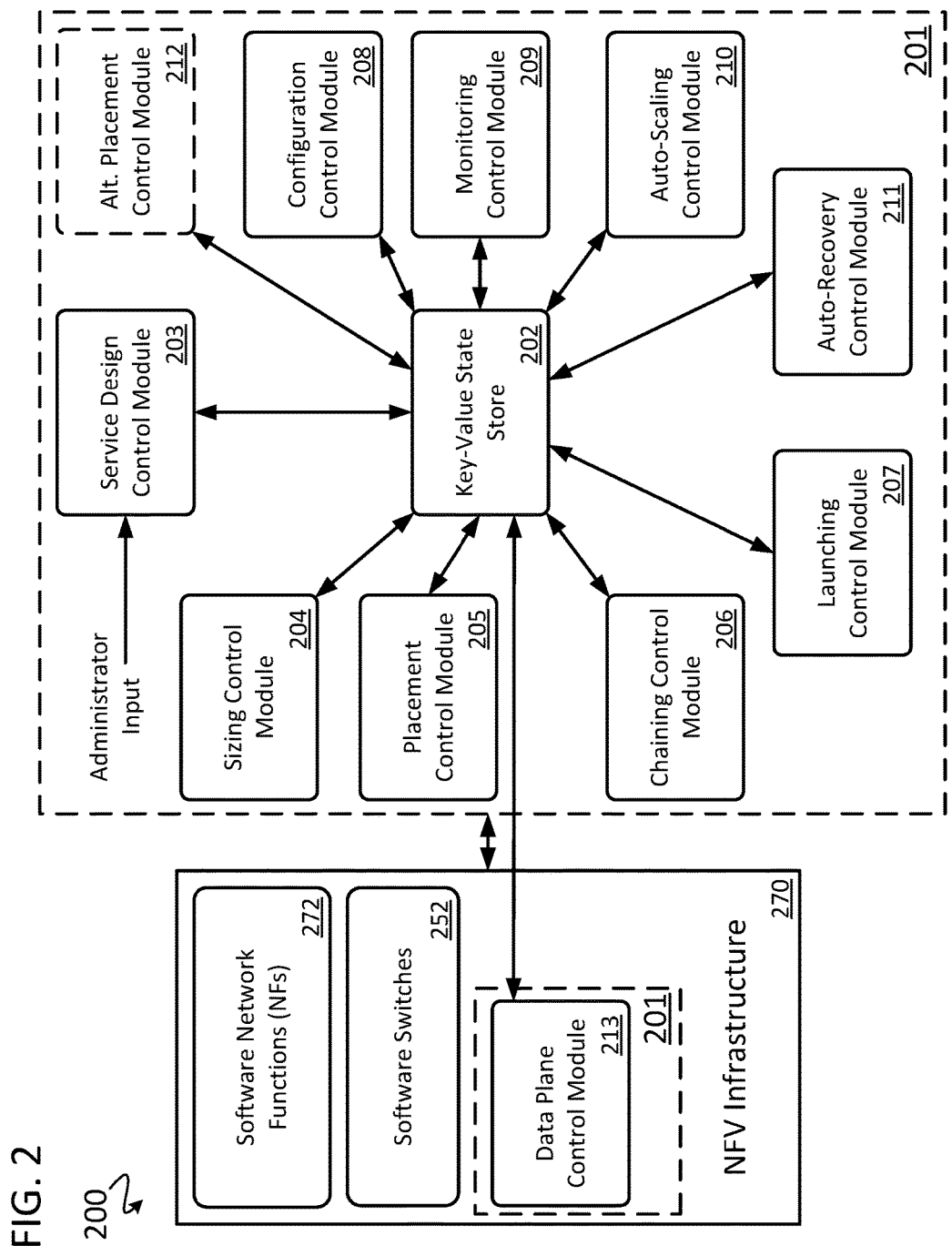
FIG. 2 is a simplified view of a modular NFV framework for software network function automation, in accordance with some embodiments.

FIG. 2 is a simplified view of a network 200 having a modular NFV framework 201 for NFV design, deployment, and maintenance of an NFV deployment 272 within an NFV infrastructure 270, in accordance with some embodiments. In general, the modular NFV framework 201 includes a highly available key-value state store 202 and a set of control modules 203-213, which together embody a decomposition of an end-to-end NFV automation process. In some embodiments, the key-value state store 202 is implemented using, but is not limited to, a key-value data base (e.g., a database for storing, retrieving, and managing associative arrays, for example using a hash table). In other embodiments, the key-value state store 202 is implemented using, but is not limited to, a relational database (e.g., a database where data is stored within predefined table structures). Other implementations of the key-value state store 202, as known to one of skill in the art, are contemplated. The set of control modules 203-213 coordinate via the key-value state store 202 to automatically design, deploy, and maintain an NFV deployment 272 (similar to 112) within an NFV infrastructure 270 (similar to 110). In some embodiments, one or more of the control modules 203-213 is a stateless control module. Stateless in this context means that the one or more control modules 203-213 do not maintain internal mid-process state across a reset event. Thus, if one of the control modules 203-213 fails, it can reconstruct its internal state from relevant states stored in the key-value state store 202. For example, a particular control module of the control modules 203-213 may be configured to read an input state S1 from the key-value state store 202, generate an output state S2, and to write the output state S2 to the key-value state store 202 for another control module to read. If the control module is reset before writing the output state S2 to the key-value state store 202, when the control module is restarted it determines that it has not yet written S2 to the key-value state store 202, and so the control module once again reads the state S1, generates the state output S2, and writes the output state S2 to the key-value state store. If instead, the control module is reset after writing the output state S2 to the key-value state store 202, when the control module is restarted, it determines that it has already written the output state S2 to the key-value state store 202 and the output state S2 does not need to be generated. Thus, the modular NFV framework disclosed herein enables fault-tolerance due to self-stabilization, i.e., the modular NFV framework will end up in a correct state regardless of with what state the modular NFV framework is initialized.

The key-value state store 202 is composed of a collection of (key, value) pairs, where each key of the collection appears no more than once in the collection, and each value of the collection is a data object (e.g., a "value") associated with a particular key. The data object can be a single value, a string, a collection of bits, bytes, a data word, a data structure, a nested data structure, and so on. When a data object is written to the key-value state store 202, a key is specified, and the data object is stored in association with the specified key. To read a data object from the key-value state store 202, a key is specified, and the data object associated with the specified key is read. Keys of the key-value state store 202 can be subscribed to, and when a value associated with a particular key is modified, subscribers to that particular key receive a notification identifying that particular key.

For example, given a sizing control module 204 that determines appropriate NF sizing (e.g., a number of NF instances within the network) and a placement control module 205 that uses the NF sizing to determine an NF placement within the infrastructure of a network, the placement control module 205 may subscribe or register to watch all keys of the key-value state store 202 having a prefix of "nfv/sizing/". When the sizing control module 204 has computed a sized NFV policy specification, denoted sized (P), the sizing control module 204 writes an entry <"nfv/sizing/P", sized(P)> to the key-value state store 202, where "nfv/sizing/P" is the key, and sized(P) is the "value", or data object, which in this case is the sized NFV policy specification. The placement control module 205, having subscribed to the key, receives a notification when the above write takes place, reads the newly added sized NFV policy specification from the key-value state store 202, and proceeds to compute a placed NFV policy specification, placed (P). When done, the placement control module 205 writes an entry <"nfv/placement/P", placed(P)> into the key-value state store 202 from where it is available for further processing by other control modules 203-213.

In some embodiments, the notification is issued as a message from the key-value state store 202 or an associated software entity (e.g., a daemon) and is received by a subscribing control module of the control modules 203-213 (e.g., over a TCP/IP connection). In other embodiments, a control module which has subscribed to a particular key polls or watches that key (e.g., by periodically monitoring or reading from the key-value state store), and the notification comes from within the subscribing control module which then takes action in response to receiving the notification. In yet other embodiments, all of the control modules 203-213 receive a notification that a value associated with a key has changed, however only the control modules that have subscribed to that key respond. The action taken for each of these embodiments, typically, is to read the data object (from the key-value state store 202) which is associated with that particular key.

In some embodiments, the control modules 203-213 include a service design control module 203, the sizing control module 204, the placement control module 205, a chaining control module 206, a launching control module 207, a configuration control module 208, a monitoring control module 209, an auto-scaling control module 210, an auto-recovery control module 211, an alternate ("Alt.") placement control module 212, and a data plane control module 213. Other, or different, control modules or combinations of control modules may also be part of the modular NFV framework 201. Though example processes for each of the control modules 203-213 are described herein, each of the control modules 203-213 can perform additional processes. For example, a control module that generates an NFV policy specification may also perform a configuration of a network component. Additionally, one or more of the control modules 203-213 may also change a configuration of one or more software components within an NFV service. In some embodiments, changing a configuration of one or more software components includes changing, by one or more of the control modules 203-213, a configuration of a software switch (e.g., to configure encapsulation, decapsulation, and/or load balancing). In some embodiments, changing a configuration of one or more software components includes changing, by one or more of the control modules 203-213, a configuration of a load balancer of an NFV service. In some embodiments, changing a configuration of one or more software components includes changing, by one or more of the control modules 203-213, a configuration of a router of an NFV service. In some embodiments, portions of processes are shared by two or more of the control modules 203-213, different control modules of the control modules 203-213 can perform similar processes, and portions of processes performed by the control modules 203-213 can overlap with one another. The modular NFV framework 201 is not limited to the control modules 203-213.

The control modules 203-213 write data objects to the key-value state store 202 and read data objects from the key-value state store 202. In some embodiments, one or more of the control modules 203-213 is stateless and does not retain a state of the network, or a mid-process state, across a reset event, instead receiving all network and process state information from the key-value state store 202. In some embodiments, the control modules 203-213 coordinate and communicate between each other exclusively by writing data objects to the key-value state store 202 and reading data objects from the key-value state store 202. Reading a data object from the key-value state 202 store includes, but is not limited to, retrieving the data object across a data bus, retrieving the data object from across a data network, and retrieving the data object from a shared memory. Writing a data object to the key-value state 202 store includes, but is not limited to, transmitting the data object across a data bus, transmitting the data object across a data network, and adding the data object to a shared memory. Two or more of the control modules 203-213 can coordinate with each other by exchanging NFV policy specifications, exchanging states, instructions, status, or other information via the key-value state store 202. In some embodiments, the control modules 203-213 coordinate and communicate network state and policy data between each other exclusively by writing data objects to the key-value state store 202 and reading data objects from the key-value state store 202, while some debugging or profiling information is exchanged between one or more of the control modules 203-213, e.g., by using a pairwise API or through another module. In some embodiments, one or more of the control modules 203-213 receive data objects, instructions, or commands from a graphical user interface, a command line interface, or another interface.

Figure 3:
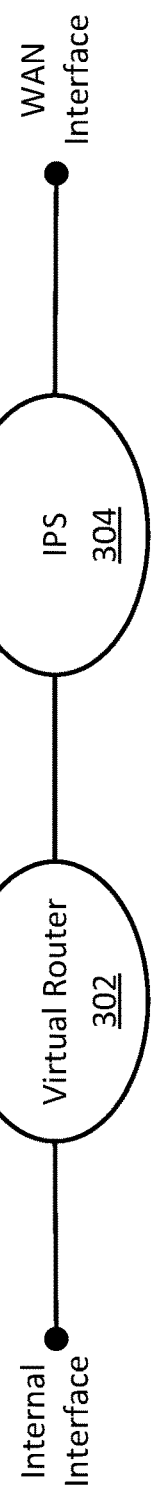
FIG. 3 is a simplified graph of a logical NFV policy specification, in accordance with some embodiments.

In an example situation, the service design control module 203 receives from a user, such as an administrator of a network, a definition of an NFV policy. In some embodiments, the definition of the NFV policy is an NFV policy specification. The service design control module 203 then uses the definition of the NFV policy to generate a logical NFV policy specification. A logical NFV policy specification specifies how traffic shall flow through a series of NFs (e.g., an NFV service) within a network to implement an NFV policy. The input provided by the administrator can be an NFV policy defining an NFV service in a logical and declarative manner, such as a graph in which nodes of the graph are NFs and edges of the graph specify how traffic flows between the NFs. The service design control module 203 can receive this NFV policy from the administrator as a high-level abstraction via a graphical user interface (GUI), via a language such as YAML or TOSCA or another text format, via a command line interface, from a library, or via another appropriate input or language. For example, this high-level abstraction might simply specify that all traffic flowing between a customer's internal interface and a wide-area-network (WAN) should be processed by a router NF (e.g., a virtual router), and an intrusion prevention system (IPS) NF. The service design control module 203 receives the high-level abstraction and generates a logical NFV policy specification, as illustrated in a simplified graph 300 (FIG. 3), in accordance with some embodiments. In some embodiments, the high-level abstraction received by the service design control module 203 is used directly as the logical NFV policy specification.

As shown, the logical NFV policy specification of the simplified graph 300 specifies that traffic originating at an internal interface (e.g., within the customer's network), shall flow through a virtual router NF 302 and an IPS NF 304, before reaching a WAN interface. The logical NFV policy specification can be expressed using a common syntax or language (e.g., YAML, JSON, or a custom internal format) which can be interpreted by other relevant control modules of the control modules 203-213. Upon generating the logical NFV policy specification, the service design control module 203 writes the logical NFV policy specification to the key-value state store 202 in association with a unique key (e.g., K1). The logical NFV policy specification may be written to the key-value state store 202 as a data object, or as part of an encapsulating data object. Other control modules of the control modules 203-213 which have previously subscribed to the key (K1) associated with the logical NFV policy specification then receive a notification that a value associated with the key (K1) has changed. For example, the sizing control module 204, having previously subscribed to the key (K1) associated with the logical NFV policy specification, will receive a notification, and subsequently read the logical NFV policy specification from the key-value state store 202 in response to the notification. In some embodiments, all of the control modules 203-213 receive the notification that a value associated with the key (K1) has changed, and the sizing control module 204 responds to the notification because it is subscribed to the key (K1), but other control modules that are not subscribed to the key (K1) do not respond. In other embodiments, the sizing control module 204 receives a message from the key-value state store 202 (e.g., over a TCP/IP connection) indicating that a value associated with the key (K1) has changed, and the sizing control module 204 responds to the received notification.

Figure 4:
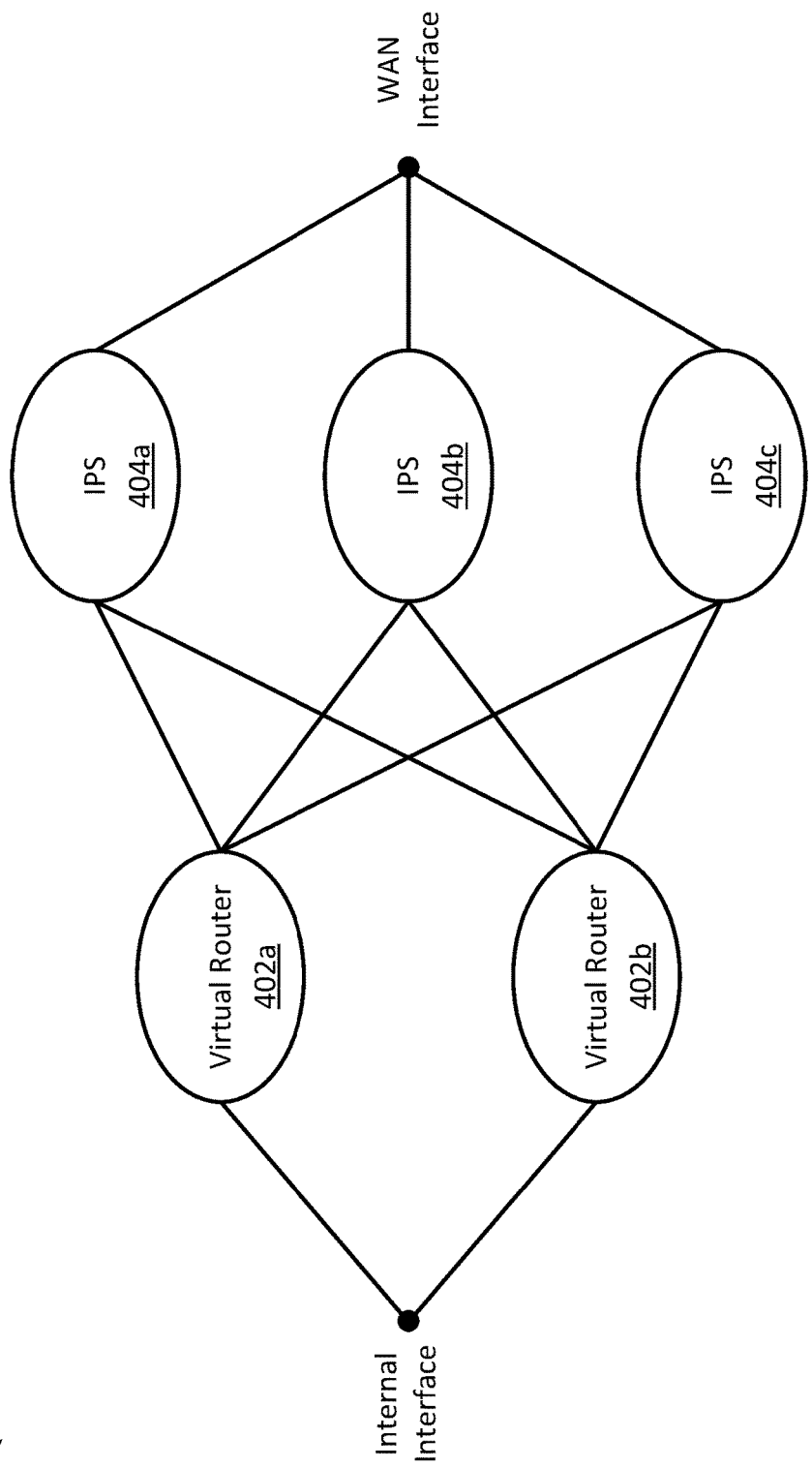
FIG. 4 is a simplified graph of a sized NFV policy specification, in accordance with some embodiments.

In general, in this example, the sizing control module 204 uses the logical NFV policy specification (e.g., of graph 300) to determine how many instances of each NF (e.g., 302 and 304) of the logical NFV policy specification are needed and converts the logical NFV policy specification into a sized NFV policy specification. A sized NFV policy specification specifies how many instances of each network component, e.g., an NF, are required to implement an NFV policy. The sizing control module 204 uses the logical NFV policy specification, and in some embodiments, per-NF performance profiles and/or statistics, policy constraints such as min/max performance targets, a number of available software licenses, or other inputs, to generate the sized NFV policy specification. The sized NFV policy specification is in some embodiments a graph representation in which each node of the graph is an NF instance, and each edge of the graph represents how network traffic is split across or directed between the NF instances. For example, FIG. 4 shows a simplified graph 400 of a sized NFV policy specification, in accordance with some embodiments. As shown in the simplified graph 400, the sized NFV policy specifies that network traffic received at the internal interface will be split across virtual router NF instances 402a-b of the logical virtual router 302 and IPS NF instances 404a-c of the logical IPS NF 304 before reaching the WAN interface. Upon generating the sized NFV policy specification, the sizing control module 204 writes the sized NFV policy specification to the key-value state store 202 in association with a unique key (e.g., K2). The sized NFV policy specification may be written to the key-value state store 202 as a data object, or as part of an encapsulating data object. Other control modules of the control modules 203-213 which have previously subscribed to the key (K2) associated with the sized NFV policy specification then receive a notification that a value associated with the key (K2) has changed. For example, the placement control module 205, having previously subscribed to the key (K2) associated with the sized NFV policy specification, will receive a notification, and subsequently read the sized NFV policy specification from the key-value state store 202 in response to the notification. In some embodiments, all of the control modules 203-213 receive the notification that a value associated with the key (K2) has changed, however only the control modules that have subscribed to the key (K2) respond. In other embodiments, only the control modules of the control modules 203-213 which have subscribed to the key (K2) receive a message from the key-value state store 202 (e.g., over a TCP/IP connection) indicating that a value associated with the key (K2) has changed.

Figure 5:
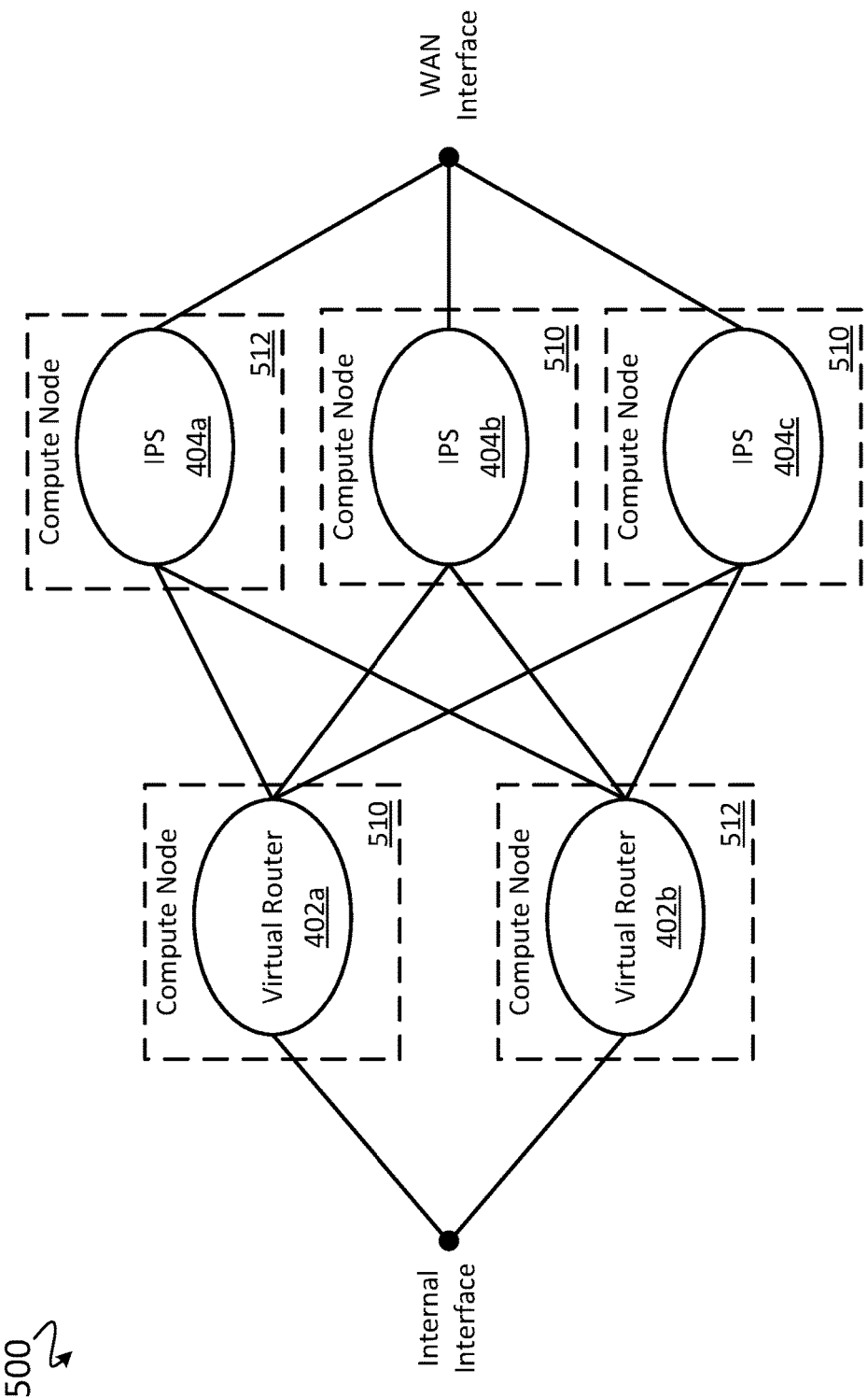
FIG. 5 is a simplified graph of a placed NFV policy specification, in accordance with some embodiments.

In general, in this example, the placement control module 205 uses the sized NFV policy specification to determine which resources of the NFV infrastructure 270 should be allocated to each NF instance 402*a-b* and 404*a-c*. The placement control module 205 uses the sized NFV policy specification, and in some embodiments, a resource map of which resources are available to the NFV deployment (e.g., compute nodes, cores, memory, network interface cards (NICs), and so on, of the NFV infrastructure 270), to generate a placed NFV policy specification. A placed NFV policy specification specifies where network components which implement an NFV policy should be placed (e.g., deployed) within a network (e.g., within an NFV infrastructure). Thus, the placed NFV policy specification specifies where each NF instance 402*a-b* and 404*a-c* is to be placed, or located, within the NFV infrastructure 270. The placed NFV policy specification is in some embodiments a graph representation in which each node of the graph is an NF instance, and each node is associated with a resource upon which that NF instance is to be run or within which that NF instance is to be placed. For example, FIG. 5 shows a simplified graph 500 of a placed NFV policy specification, in accordance with some embodiments. As shown in the simplified graph 500, the placed NFV policy specification specifies that the virtual router NF instance 402*a* and the IPS NF instances 404*b-c* are to be placed at a first compute node 510 of the NFV infrastructure 270, and the virtual router 402*b* and the IPS NF instance 404*a* are to be placed at a second compute node 512 of the NFV infrastructure 270. Upon generating the placed NFV policy specification, the placement control module 205 writes the placed NFV policy specification to the key-value state store 202 in association with a unique key (e.g., K3). The placed NFV policy specification may be written to the key-value state store 202 as a data object, or as part of an encapsulating data object. Other control modules of the control modules 203-213 which have previously subscribed to the key (K3) associated with the placed NFV policy specification then receive a notification that a value associated with the key (K3) has changed. For example, the chaining control module 206, having previously subscribed to the key (K3) associated with the placed NFV policy specification, will receive a notification, and subsequently read the placed NFV policy specification from the key-value state store 202 in response to the notification. In some embodiments, all of the control modules 203-213 receive the notification that a value associated with the key (K3) has changed, however only the control modules that have subscribed to the key (K3) respond. In other embodiments, only the control modules of the control modules 203-213 which have subscribed to the key (K3) receive a message from the key-value state store 202 (e.g., over a TCP/IP connection) indicating that a value associated with the key (K3) has changed.

In some embodiments, the optional alternate placement control module 212 also subscribes to the key (K2) and receives a notification when the sized NFV policy is stored in the key-value state store 202 in association with the key (K2). For example, the placement control module 205 could configure an NFV service of the network where performance is imperative, and the alternate placement control module 212 could configure another NFV service of the network where resilience is imperative. Thus, the placement control module 205 could generate a placed NFV policy specification having NFs placed close together (e.g., optimizing throughput), and the alternate placement control module 212 could generate a placed NFV policy specification having widely distributed NFs (e.g., optimizing resiliency). In this sense, the placed NFV policy specification generated by the placement control module 205 and the placed NFV policy specification generated by the alternate placement control module 212 are the same type of NFV policy specifications. In this simple example, two control modules 205, 212, which perform similar tasks co-exist in the modular NFV framework 201. Similarly, multiple (e.g., two or more) instances any of the control modules 203-213 could also co-exist in the modular NFV framework 201.

Figure 6:
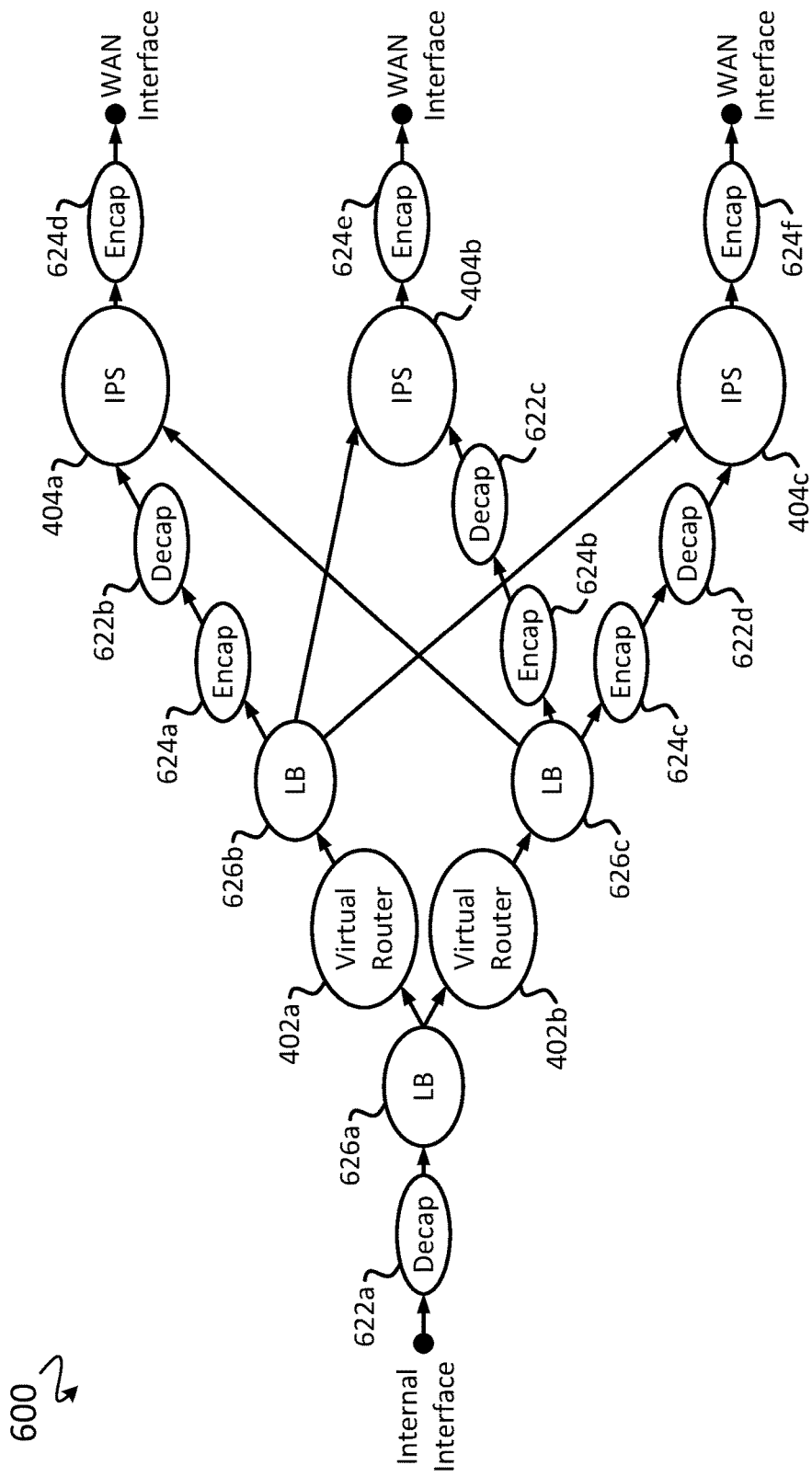
FIG. 6 is a simplified graph of a chained NFV policy specification, in accordance with some embodiments.

In general, in this example, the chaining control module 206 uses the placed NFV policy specification to determine a packet-level classification, load-balancing, and forwarding encapsulation/decapsulation that must be implemented on ingress/egress to each NF to direct network traffic between NFs in accordance with the placed NFV policy specification. The chaining control module 206 uses the placed NFV policy specification to generate a chained NFV policy specification. The chained NFV policy specification specifies how network traffic shall flow between network components (e.g., NFs) used to implement an NFV policy. The chained NFV policy specification is in some embodiments the placed NFV policy specification graph representation extended with nodes that represent different chaining-related functionality (e.g., encapsulation/decapsulation, load-balancing, and so on). For example, FIG. 6 shows a simplified graph 600 of a chained NFV policy specification, in accordance with some embodiments. Placement details, similar to those shown in FIG. 5 are included in the chained NFV policy specification but have been omitted from the simplified graph 600 only for the purpose of simplifying this description. As shown in the simplified graph 600, the chained NFV policy specifies that in addition to the virtual router NF instances 402*a-b* and the IPS NF instances 404*a-c*, decapsulation nodes 622*a-d*, encapsulation nodes 624*a-f*, and load balancing nodes 626*a-c* have been specified. Additional nodes (not shown for simplicity) may also be specified. Upon generating the chained NFV policy specification, the chaining control module 206 writes the chained NFV policy specification to the key-value state store 202 in association with a unique key (e.g., K4). The chained NFV policy specification may be written to the key-value state store 202 as a data object, or as part of an encapsulating data object.

Other control modules of the control modules 203-213 which previously subscribed to the key (K4) associated with the chained NFV policy specification then receive a notification that a value associated with the key (K4) has changed. For example, the launching control module 207, having previously subscribed to the key (K4) associated with the chained NFV policy specification, will receive a notification, and subsequently read the chained NFV policy specification from the key-value state store 202 in response to the notification. In some embodiments, all of the control modules 203-213 receive the notification that a value associated with the key (K4) has changed, however only the control modules that have subscribed to the key (K4) respond. In other embodiments, only the control modules of the control modules 203-213 which have subscribed to the key (K4) receive a message from the key-value state store 202 (e.g., over a TCP/IP connection) indicating that a value associated with the key (K4) has changed.

Figure 7:
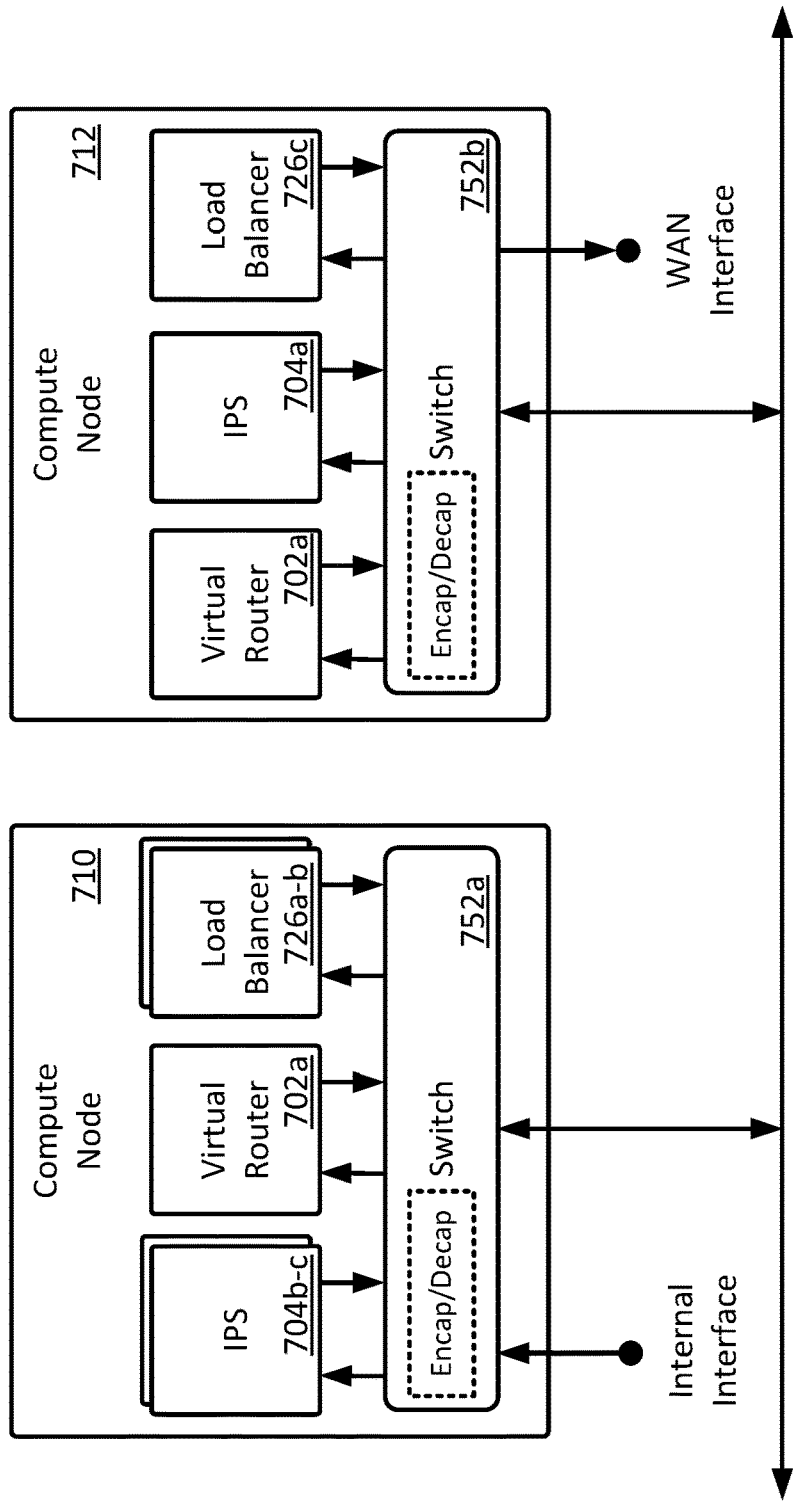
FIG. 7 is a simplified diagram of a network architecture for a launched NF deployment, in accordance with some embodiments.

In general, in this example, the launching control module 207 uses the chained NFV policy specification to launch (e.g., deploy, execute, or instantiate) all of the components (e.g., all of the nodes, such as the NFs, encapsulation/decapsulation nodes, load balancing nodes, etc.) listed with placement details in the chained NFV policy specification. In some embodiments, the launching control module 207 reads a data object which contains a pointer to a repository for various node and/or NF implementations. These implementations may be VMs, containers, processes, or code modules. Launching a node deploys that node (e.g., the node is installed and/or running as software, as dedicated hardware, or otherwise implemented) within the NFV infrastructure 270. For example, FIG. 7 shows a simplified network architecture 700 for a launched NF deployment within the NFV infrastructure 270, in accordance with some embodiments. The simplified network architecture 700, generally includes compute nodes 710, 712 within the NFV infrastructure 270. In accordance with the chained NFV policy specification, a virtual router NF instance 702a, IPS NF instances 704b-c, and load balancer NF instances 726a-b are deployed at compute node 710, thereby embodying a portion of a deployed, or deployed, NFV service. These components send and receive network traffic (e.g., from the internal interface) through a network switch 752a (e.g., a software switch of a software data plane) of the software switches 252. The network switch 752a directs network traffic through the embodied NFV service, and in some embodiments performs the task of encapsulation/decapsulation. Similarly, virtual router NF instance 702a, IPS NF instance 704a, and load balancer NF instance 726c are deployed at compute node 712. These components send and receive network traffic (e.g., to the WAN interface) through a network switch 752b of the software switches 252. The network switch 752b directs network traffic through the embodied NFV service, and in some embodiments performs the task of encapsulation/decapsulation. After the launching control module 207 has launched all of the components (e.g., all of the nodes such as the NFs, encapsulation/decapsulation nodes, load balancing nodes, etc.) listed with placement details in the chained NFV policy specification, the launching control module 207 writes a list of launched components and their locations to the key-value state store 202 in association with a unique key (e.g., K5). The list of launched components and their locations may be written to the key-value state store 202 as a data object, or as part of an encapsulating data object. In some embodiments, the list refers to the newly launched components and to repositories for their corresponding configurations. Other control modules of the control modules 203-213 which previously subscribed to the key (K5) associated with the list of launched components then receive a notification that a value associated with the key (K5) has changed. For example, the configuration control module 208, having previously subscribed to the key (K5) associated with the list of launched components and their locations, will receive a notification, and subsequently read the list from the key-value state store 202 in response to the notification. In some embodiments, all of the control modules 203-213 receive the notification that a value associated with the key (K5) has changed, however only the control modules that have subscribed to the key (K5) respond. In other embodiments, only the control modules of the control modules 203-213 which have subscribed to the key (K5) receive a message from the key-value state store 202 (e.g., over a TCP/IP connection) indicating that a value associated with the key (K5) has changed.

In some embodiments, the network switches 752a-b are configured and/or controlled by the data plane control module 213 to direct the network traffic through the virtual router NF instance 702a, the IPS NF instances 704b-c, and the load balancer NF instances 726a-b.

In general, in this example, the configuration control module 208 uses the list of launched components and their locations to configure one or more of the newly launched components. The configuration control module 208 then writes indicators of configuration success or failure corresponding to each of the configured components to the key-value state store state 202 in association with a unique key (e.g., K6). The indications of success or failure may be written to the key-value state store 202 as a data object, or as part of an encapsulating data object. Other control modules of the control modules 203-213 which have previously subscribed to the key (K6) associated with the indications of success or failure then receive a notification that a value associated with the key (K6) has changed. In some embodiments, all of the control modules 203-213 receive the notification that a value associated with the key (K6) has changed, however only the control modules that have subscribed to the key (K6) respond. In other embodiments, only the control modules of the control modules 203-213 which have subscribed to the key (K6) receive a message from the key-value state store 202 (e.g., over a TCP/IP connection) indicating that a value associated with the key (K6) has changed.

Multiple control modules may subscribe to the same key. For example, the monitoring control module 209 may also subscribe to the key (K5) associated with the list of launched components and their locations. Thus, when the launching control module 207 writes the list of launched components and their locations to the key-value state store 202, the monitoring control module 209 will respond when it receives the notification (K5) and subsequently read the list from the key-value state store 202 in response to the notification.

In general, in this example, the monitoring control module 209 uses the list of launched components and their locations to collect health and performance statistics for one or more components of the NFV deployment within the NFV infrastructure 270. The monitored components include NFs, compute nodes, switches, network interfaces, and other relevant components. In some embodiments, the monitoring control module 209 writes measured health and performance statistics to the key-value state store 202 in association with a unique key (e.g., K7). In other embodiments, the monitoring control module 209 configures a component of the network, such as an NF or a software switch, to measure health and performance statistics for that component and to write those measured health and performance statistics to the key-value state store 202 in association with a unique key (e.g., K7). The measured health and performance statistics may be written to the key-value state store 202 as a data object, or as part of an encapsulating data object. Other control modules of the control modules 203-213 which have previously subscribed to the key (K7) associated with the measured health and performance statistics then receive a notification that a value associated with the key (K7) has changed. For example, the auto-scaling control module 210, having previously subscribed to the key (K7) associated with the measured health and performance statistics, will receive a notification, and subsequently read the list from the key-value state store 202 in response to the notification. In some embodiments, all of the control modules 203-213 receive the notification that a value associated with the key (K7) has changed, however only the control modules that have subscribed to the key (K7) respond. In other embodiments, only the control modules of the control modules 203-213 which have subscribed to the key (K7) receive a message from the key-value state store 202 (e.g., over a TCP/IP connection) indicating that a value associated with the key (K7) has changed.

In general, in this example, the auto-scaling control module 210 uses the measured health and performance statistics and additional policy constraints (e.g., a number of available licenses, min/max performance targets, etc.) to determine whether, and by how much, to increase or decrease the number of NF instances deployed in the NFV infrastructure 270. Having made those determinations, the auto-scaling control module 210 generates an updated sized NFV policy specification. Generating the updated sized NFV policy specification may involve adding/removing nodes and their corresponding edges to or from the original sized NFV policy specification (which the auto-scaling control module 210 can read from the key-value state store 202). In some embodiments, upon generating the updated sized NFV policy specification, the auto-scaling control module 210 writes the updated sized NFV policy specification to the key-value state store 202 in association with the unique key (K2) associated with the sized NFV policy specification. The updated sized NFV policy specification may be written to the key-value state store 202 as a data object, or as part of an encapsulating data object. As previously described, other control modules of the control modules 203-213 which have previously subscribed to the key (K2) associated with the sized NFV policy specification then receive a notification that a value associated with the key (K2) has changed. For example, the placement control module 205, having previously subscribed to the key (K2) associated with the sized NFV policy specification, will receive a notification, and subsequently read the updated sized NFV policy specification from the key-value state store 202 in response to the notification. As described above, the placement control module 205 will then generate an updated placed NFV policy specification and store it to the key-value state store in association with the key (K3), causing control modules subscribed to K3 to respond when they receive a notification, and so on, until flow reaches the launching control module 207 which may then deploy or terminate NFs within the NFV infrastructure 110 in accordance with the updated sized NFV policy specification.

As previously described, multiple control modules may subscribe to the same key. For example, the auto-recovery control module 211 may also subscribe to the key (K7) associated with the measured health and performance statistics. Thus, when the monitoring control module 209 writes, or configures appropriate software components (e.g., NFs or software switches) of the network to write, the measured health and performance statistics to the key-value state store 202, the auto-recovery control module 211 will respond when it receives the notification associated with the key (K7) and subsequently read the measured health and performance statistics from the key-value state store 202 in response to the notification.

In general, in this example, the auto-recovery control module 211 uses the measured health and performance statistics to detect when a component of the NFV infrastructure 270 fails or exhibits performance indicative of a potentially imminent failure or operation degradation. Upon detecting that a component has failed or degraded, the auto-recovery control module 211 generates an updated sized NFV policy specification and an updated resource map. Generating the updated sized NFV policy specification may involve adding/removing nodes and their corresponding edges to or from the original sized NFV policy specification (which the auto-recovery control module 211 can read from the key-value state store 202) or marking existing nodes and edges as "reset", i.e., such that these nodes and/or edges are treated as new nodes by other control modules. In some embodiments, upon generating the updated sized NFV policy specification, the auto-recovery control module 211 writes the updated sized NFV policy specification to the key-value state store 202 in association with the unique key (K2) associated with sized NFV policy specification. The updated sized NFV policy specification may be written to the key-value state store 202 as a data object, or as part of an encapsulating data object. As previously described, other control modules of the control modules 203-213 which have previously subscribed to the key (K2) associated with the sized NFV policy specification then receive a notification that a value associated with the key (K2) has changed. For example, the placement control module 205, having previously subscribed to the key (K2) associated with the sized NFV policy specification, will receive a notification, and subsequently read the updated sized NFV policy specification from the key-value state store 202 in response to the notification. As described above, the placement control module 205 will then generate an updated placed NFV policy specification and store it to the key-value state store in association with the key (K3), causing control modules subscribed to K3 to respond when they receive a notification, and so on, until flow reaches the launching control module 207 which may then deploy or terminate NFs within the NFV infrastructure 110 in accordance with the updated sized NFV policy specification.

In general, in this example, the data plane control module 213 configures and/or controls a software data plane of the NFV infrastructure 270 to direct network traffic through the NFs 272 deployed within the NFV infrastructure 270, thereby implementing an NFV service. A data plane is the portion of a network that carries, bears, or forwards, network traffic. A software data plane configures and directs the flow of network traffic via network components which are implemented in, and/or controlled by, software, such as software switches (e.g., virtual switches) and software routers (e.g., virtual routers). In some embodiments, the software data plane of the NFV infrastructure 270 includes the one or more software switches 252 which are communicatively coupled to one or more NFs of the NFs 272. In such embodiments, the data plane control module 213 configures and/or modifies, in accordance with the chained NFV policy specification, the one or more software switches 252 of the NFV infrastructure 270 to direct the network traffic flow through the NFs 272 of the NFV infrastructure 270. In other embodiments, the data plane control module 213 configures one or more network switches that are external to the NFV infrastructure 270.

In some embodiments, one or more of the NFs 272 directly subscribe to one or more keys of the key-value state store 202. In some embodiments, one or more NFs of the NFV infrastructure 270 read data objects directly from, and/or write data objects to, the key-value state store 202. In one or more embodiments, an operational state of an NF of the NFs 272 is stored as a data object to the key-value state store 202. If that NF suffers from an error or is reset at a later time, the last saved operational state of that NF can be retrieved from the key-value state store 202 and used to restore that NF.

FIGS. 8A-D provide a simplified example workflow 800 of the modular NFV framework 201 for software network function automation within the network 200, in accordance with some embodiments. The particular steps, the order of steps, and the combination of steps are shown for illustrative and explanatory purposes only. Other embodiments can implement different particular steps, orders of steps, and combinations of steps to achieve similar functions or results. The example workflow 800 describes in more detail control modules 203-213, keys K1-K7, data objects, signal flow, and operations previously introduced with reference to FIGS. 2-7. At step 802, of FIG. 8A, the service design control module 203 receives an input at step 802 from an administrator (e.g., a user having elevated privileges) of the network 200. At step 803 the sizing control module 204 subscribes to the key K1 of the key-value state store 202. Additionally, at step 804 the placement control module 205 subscribes to the key K2 of the key-value state store 202. Steps 803 and 804 could alternatively occur before step 802, i.e., at any time prior to the occurrence of the example workflow 800. In some embodiments, each of the control modules 203-213 subscribe to keys, or key prefixes, of the key-value state store 202 before the workflow 800 begins. At step 805, the service design control module 203 uses the input received from the administrator to generate a logical NFV policy specification. At step 806 the service design control module 203 writes a data object that is, or includes, the logical NFV policy specification to the key K1 in the key-value state store 202, e.g., at a location within a data structure, a file structure, a directory, a database, or other construct that is associated with the key K1.

In response to the data object having been written to the key-value state store 202, the key-value state store 202 issues a notification associated with the key K1 to the modules 203-213. As a result, at step 807, the sizing control module 204 receives the notification associated with the key K1. Having previously subscribed to the key K1, the sizing control module 204 then reads (at step 808) the logical NFV policy specification from the key K1 in the key-value state store 202 in response to the received notification. At step 809, the sizing control module 204 uses the logical NFV policy specification to generate a sized NFV policy specification. At step 810, the sizing control module 204 writes a data object that is, or includes, the sized NFV policy specification to the key K2 in the key-value state store 202, e.g., at a location that is associated with the key K2. In response to data being written to the key-value state store 202 in association with the key K2, the key-value state store 202 issues a notification associated with the key K2 to the modules 203-213. As a result, at step 811, the placement control module 205 receives the notification associated with the key K2. Having previously subscribed to the key K2, at step 812, in response to having received the notification at step 811, the placement control module 205 reads the sized NFV policy specification from the key K2 in the key-value state store 202.

Figure 8A:
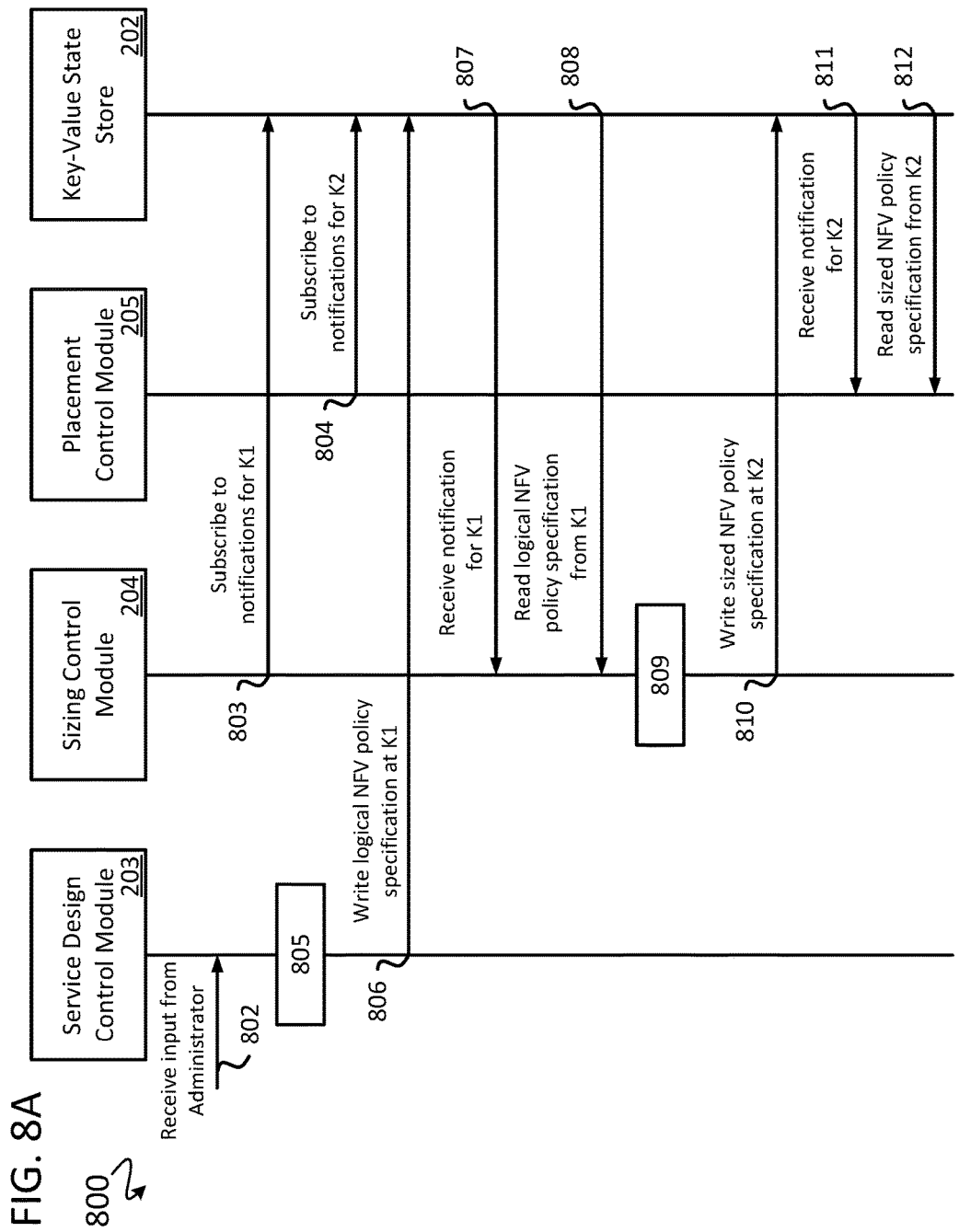
Figure 8B:
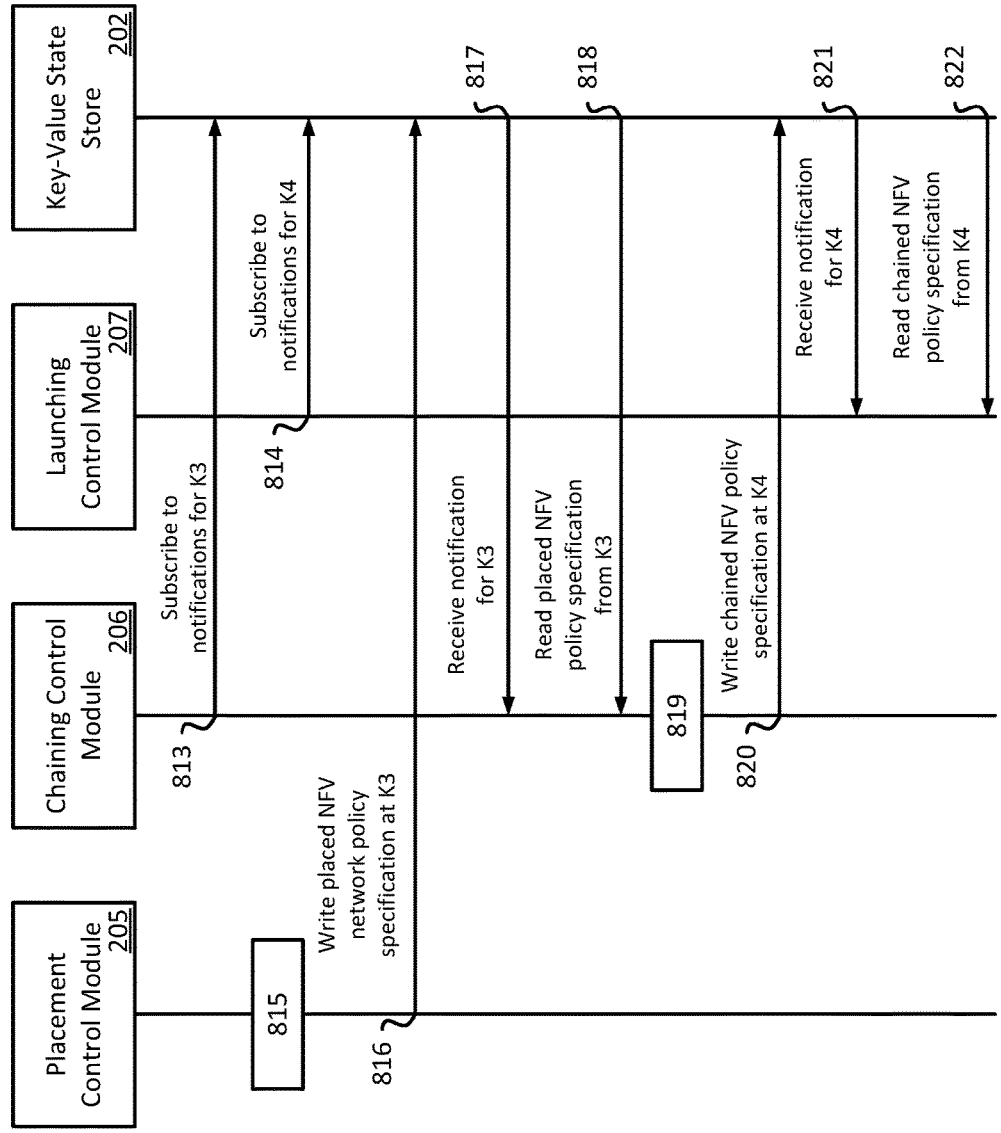

At step 813 of FIG. 8B, the chaining control module 206 subscribes to the key K3 of the key-value state store 202, and at step 814 the launching control module 207 subscribes to the key K4 of the key-value state store 202. Steps 813 and 814 could alternatively occur before any of the preceding steps, i.e., at any time prior to the occurrence of the example workflow 800. At step 815, the placement control module 205 uses the sized NFV policy specification to generate a placed NFV policy specification, and at step 816, the placement control module 205 writes a data object that is, or includes, the placed NFV policy specification to the key K3 in the key-value state store 202, e.g., at a location that is associated with the key K3.

In response to the data object having been written to the key-value state store 202, the key-value state store 202 issues a notification associated with the key K3 to the modules 203-213. As a result, at step 817, the chaining control module 206 receives the notification associated with the key K3. Having previously subscribed to the key K3, the chaining control module 206 then reads the placed NFV policy specification from the key K3 in the key-value state store 202 at step 818 in response to the received notification. At step 819, the chaining control module 206 uses the placed NFV policy specification to generate a chained NFV policy specification. At step 820, the chaining control module 206 writes a data object that is, or includes, the chained NFV policy specification to the key K4 in the key-value state store 202, e.g., at a location that is associated with the key K4. In response to data being written to the key-value state store 202 in association with the key K4, the key-value state store 202 issues a notification associated with the key K4 to the modules 203-213. As a result, at step 821, the launching control module 207 receives a notification that is associated with the key K4. Having previously subscribed to the key K4, at step 822, in response to having received the notification, the launching control module 207 reads the chained NFV policy specification from the key K4 in the key-value state store 202.

At step 823 of FIG. 8C, the configuration control module 208 subscribes to the key K5 of the key-value state store 202, and at step 824 the monitoring control module 209 also subscribes to the key K5 of the key-value state store 202. Steps 823 and 824 could alternatively occur before any of the preceding steps, i.e., at any time prior to the occurrence of the example workflow 800. At step 825, the launching control module 207 launches all of the components listed, with placement details, in the chained NFV policy specification. At step 826, the launching control module 207 then writes a data object that is, or includes, a list of launched components and their locations to the key K5 in the key-value state store 202, e.g., at a location that is associated with the key K5. In response to the data object having been written to the key-value state store 202, the key-value state store 202 issues a notification associated with the key K5 to the modules 203-213. As a result, at step 827, the configuration control module 208 receives the notification associated with the key K5. Having previously subscribed to the key K5, the configuration control module 208 then reads (at step 828) the list of launched components and their locations from the key K5 in the key-value state store 202 in response to the received notification. At step 829, the configuration control module 208 uses the list of launched components and their locations to configure one or more of the listed components (e.g., NFs, compute nodes, or other elements of the NFV infrastructure 110). At step 830, the configuration control module 208 writes a data object that is, or includes, an indication of configuration success or failure to the key K6 in the key-value state store 202, e.g., at a location that is associated with the key K6. In response to the data object having been written to the key K6 in the key-value state store 202, the key-value state store 202 issues a notification associated with the key K6 to the modules 203-213.

Additionally, after step 826 above, as a further result of the key-value state store 202 issuing the notification associated with the key K5 to the modules 203-213, the monitoring control module 209 also receives (at step 831) the notification associated with the key K5. Having previously subscribed to the key K5, the monitoring control module 209 then reads (at step 832) the list of launched components and their locations from the key K5 in the key-value state store 202 in response to the received notification.

Figure 8D:
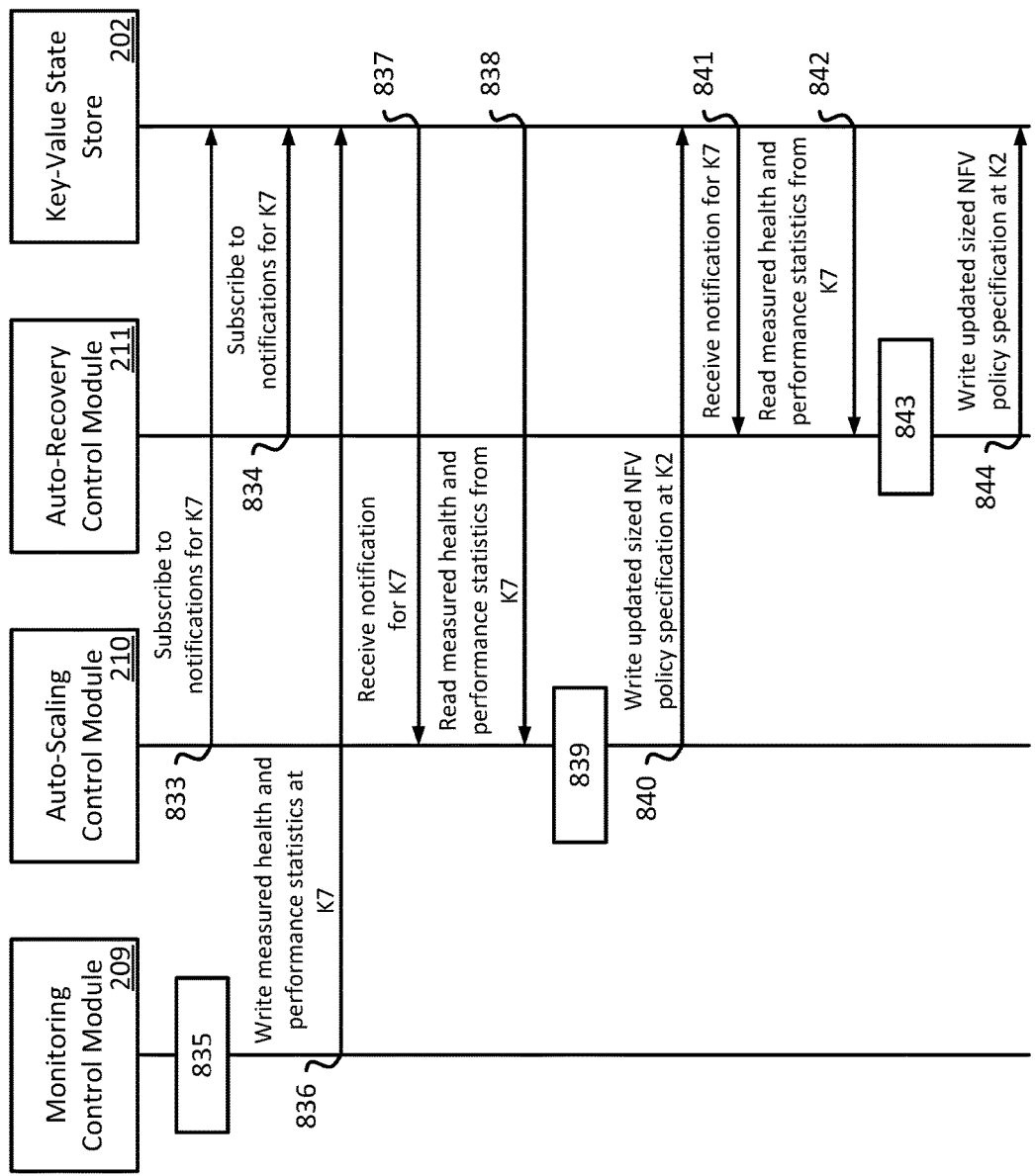

At step 833 of FIG. 8D, the auto-scaling control module 210 subscribes to the key K7 of the key-value state store 202, and at step 834 the auto-recovery control module 211 also subscribes to the key K7 of the key-value state store 202. Steps 833 and 834 could alternatively occur before any of the preceding steps. At step 835, the monitoring control module 209 collects health and performance statistics for one or more components (as provided by the list of launched components and their locations) of the NFV deployment within the NFV infrastructure 110. At step 836, the monitoring control module 209 then writes a data object that is, or includes, the measured health and performance statistics to the key K7 in the key-value state store 202, e.g., at a location that is associated with the key K7. In response to the data object having been written to the key K7 in the key-value state store 202, the key-value state store 202 issues a notification associated with the key K7 to the modules 203-213. As a result, at step 837, the auto-scaling control module 210 receives the notification associated with the key K7. Having previously subscribed to the key K7, the auto-scaling control module 210 then reads (at step 838) the measured health and performance statistics from the key K7 in the key-value state store 202 in response to the received notification.

At step 839, the auto-scaling control module 210 uses the measured health and performance statistics and additional policy constraints to determine whether, and by how much, to increase or decrease the number of NF instances deployed in the NFV infrastructure 270 and in response generates an updated sized NFV policy specification. The auto-scaling control module 210 then writes (at step 840) a data object that is, or includes, the updated sized NFV policy specification to the key K2 in the key-value state store 202, e.g., at the location that is associated with the key K2. Writing the updated sized NFV policy specification to the key K2 in the key-value state store 202 will, in some embodiments, cause the key-value state store 202 to issue the notification associated with the key K2 to the modules 203-213, so that the workflow 800 returns to step 811, where the placement control module 205 receives the notification for the key K2.

Additionally, after step 836 above, as a further result of the key-value state store 202 issuing the notification associated with the key K7 to the modules 203-213, the auto-recovery control module 211, also having previously subscribed to the key K7, receives (at step 841) the notification associated with the key K7. Having previously subscribed to the key K7, the auto-recovery control module 211 then reads the measured health and performance statistics from the key-value state store 202 at step 842 in response to the received notification. At step 843, the auto-recovery control module 211 uses the measured health and performance statistics to detect when a component of the NFV infrastructure 110 fails or exhibits performance indicative of a potentially imminent failure or operation degradation. Upon detecting that a component has failed or degraded, the auto-recovery control module 211 generates an updated sized NFV policy specification and an updated resource map. The auto-recovery control module 211 then writes (at step 844) a data object that is, or includes, the updated sized NFV policy specification to the key K2 in the key-value state store 202, e.g., at the location that is associated with the key K2. Writing the updated sized NFV policy specification to the key K2 in the key-value state store 202 will, in some embodiments, cause the key-value state store 202 to issue the notification associated with the key K2 to the modules 203-213, so that the workflow 800 returns to step 811, where the placement control module 205 receives the notification for the key K2. In the simplified example of the workflow 800, control modules of the control modules 203-213 write and/or read a single data object to or from the key-value state store 202. However, in practice multiple keys and data objects may be written to and/or read from the key-value state store 202 by control modules of the control modules 203-213. For example, the monitoring control module 209 might write a list identifying multiple network components that it is monitoring to the key-value state store 202 in association with a unique key (e.g., K8), and then write data objects including the measured health and performance data for the multiple network components to the key-value state store 202 as part of a single step, where each of the data objects is associated with an individual key (e.g., K8_1, K8_2, K8_3 . . . ). In this example, each of the keys K8_1, K8_2, K8_3 . . . have a common prefix represented as K8_*. The auto-scaling control module 210 could then subscribe to notifications for the key K8. When the list identifying the multiple network components are written to the key-value state store 202 by the monitoring control module 209, the auto-scaling control module 210 will read the list, and then subscribe to notifications for each of the keys K8_*. Additionally, multiple combinations of keys and data objects may be written to and/or read from the key-value state store 202 by control modules of the control modules 203-213. For example, a first control module of the control modules 203-213 could write data objects associated with keys K9, K10 to the key-value state store 202, and a second control module of the control modules 203-213 could write data objects associated with keys K11, K12 to the key-value state store 202. A third control module of the control modules 203-213 could subscribe to and/or read data objects associated with the keys K9, K11 from the key-value state store 202, a fourth control module of the control modules 203-213 could subscribe to and/or read data objects associated with the keys K9, K12 from the key-value state store 202, a fifth control module of the control modules 203-213 could subscribe to and/or read data objects associated with the keys K10, K12 from the key-value state store 202, and so on.

Figure 9:
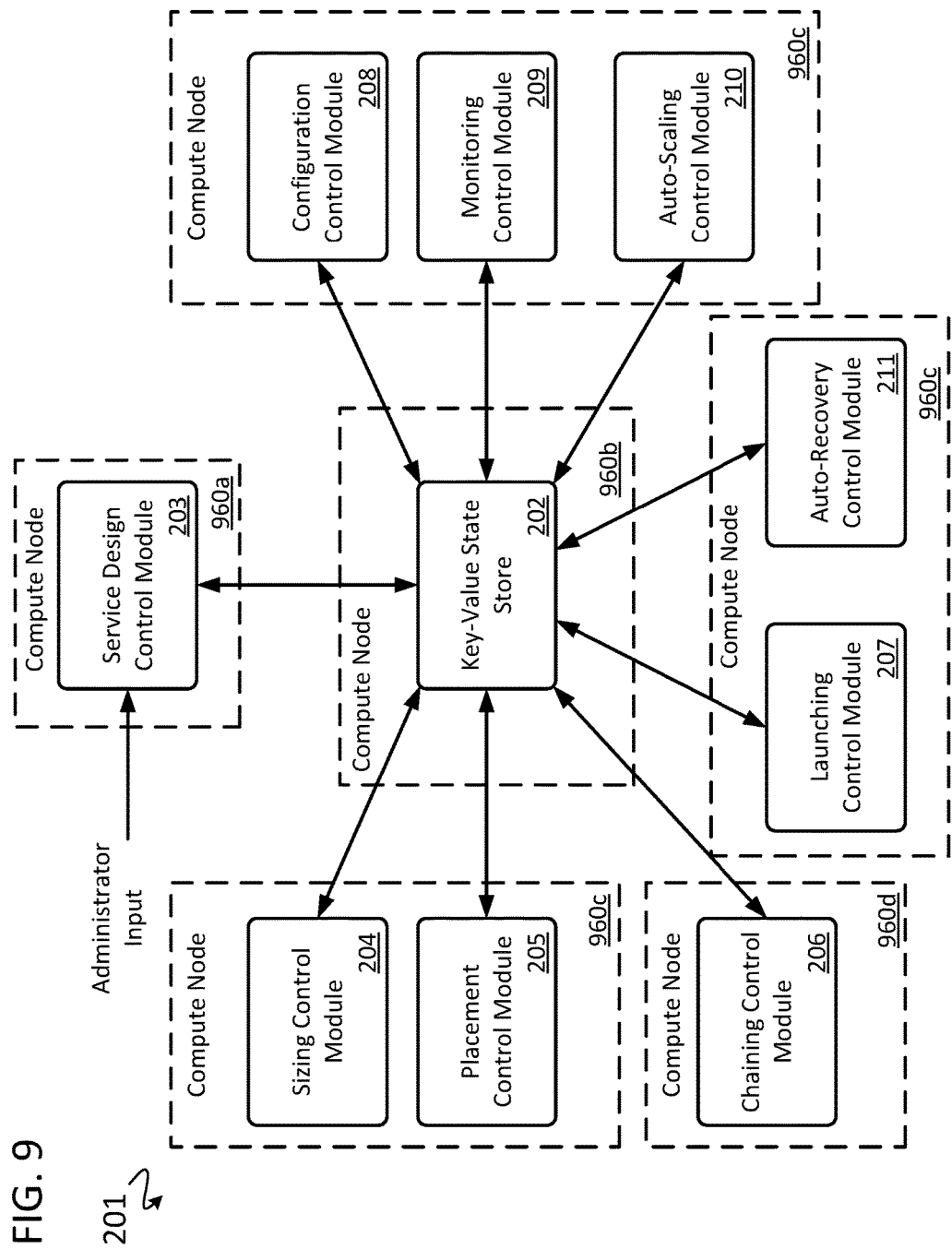
FIG. 9 is a simplified diagram of a deployed modular NFV framework, in accordance with some embodiments.

FIG. 9 is a simplified diagram of an example deployed modular NFV framework 201 for software network function automation within a network 200, in accordance with some embodiments. In the example shown, the key-value state store 202 and the control modules 203-213 are deployed at compute nodes 960a-d. In some embodiments, one or more of the compute nodes 960a-d are components of the NFV infrastructure 270. In other embodiments, one or more of the compute nodes 960a-d are components deployed outside of the NFV infrastructure 270. In some embodiments, one or more of the control modules 203-213 are implemented as, or as part of, a virtual machine. In other embodiments, one or more of the control modules 203-213 are implemented as, or as part of, a container (e.g., a segmented operating system). In still other embodiments, one or more of the control modules 203-213 are implemented as a process, or as an independent software entity. In some embodiments, one or more of the control modules 203-122 could be implemented as part of a software switch (e.g., similar to the network switches 752a-b).

Figure 10:
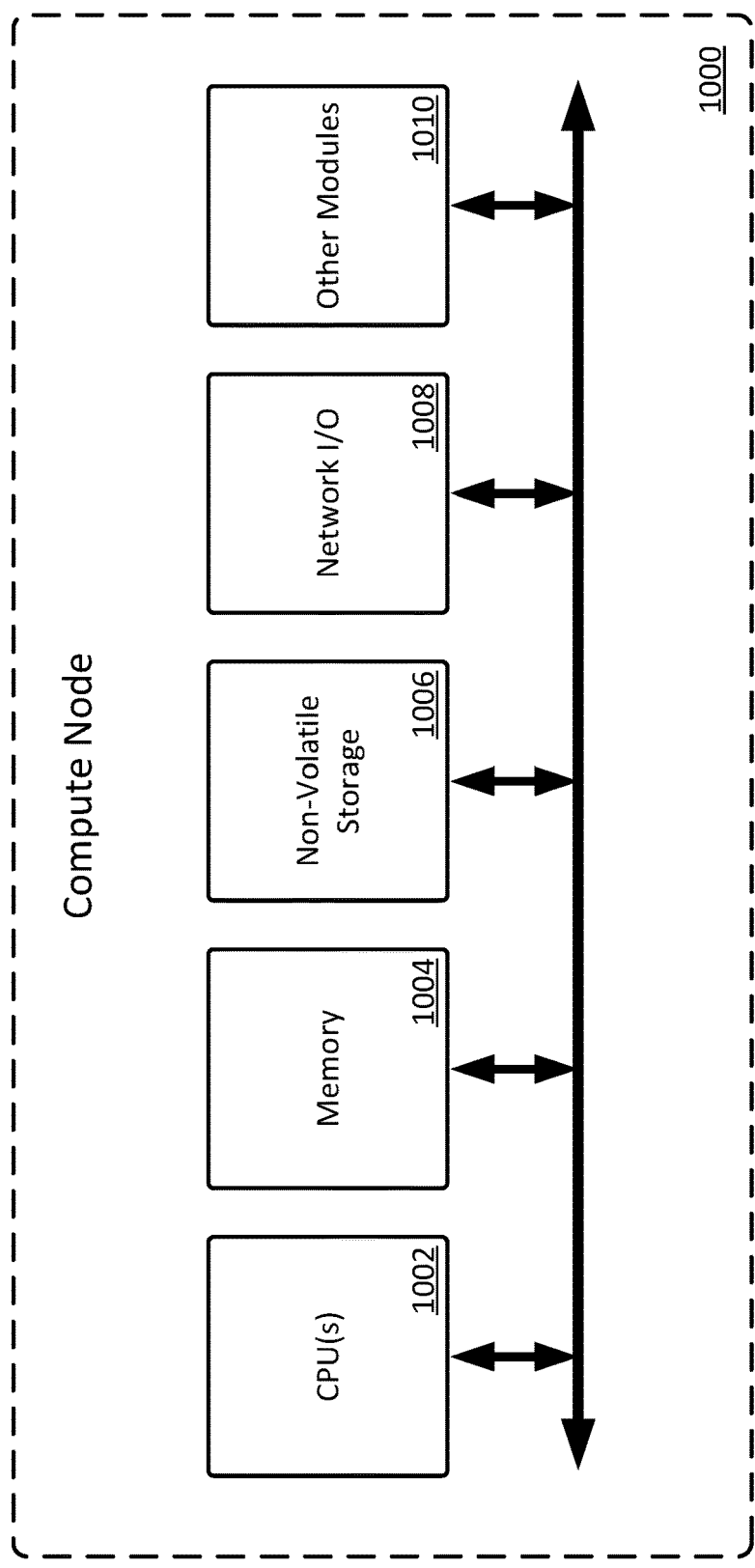
FIG. 10 is a simplified diagram of an example compute node, in accordance with some embodiments.

FIG. 10 illustrates an example compute node 1000, in accordance with some embodiments. In some embodiments, one or more of the compute nodes 710, 712, and/or 960a-d are the same as or similar to the compute node 1000. The compute node 1000 generally includes one or more CPUs 1002, a memory module 1004 (e.g., RAM), a non-volatile data storage module 1006 (e.g., a hard drive or array of hard drives), a network I/O module 1008 (e.g., a network interface card (NIC) and/or a top-of-rack interface), and other modules 1010 such as user I/O, wireless communication modules, optical communication modules, system diagnostic or monitoring modules, or other modules. In some embodiments, the compute node 1000 is configured to perform all or a portion of the process steps discussed with reference to FIGS. 2-8D. The non-volatile data storage module 1006, thus, stores data and several programs for some or all of the above-described functions and process steps, among others. The data and programs are loaded into the memory module 1004, so that the one or more CPUs 1002 (in conjunction with the memory module 1004) can perform some or all of the above-described functions and process steps, among others. In some embodiments, the CPUs 1002 are shared or dedicated CPUs. These CPUs could perform a single network function, perform multiple network functions, or perform other tasks in addition to performing network functions. Examples of the CPUs 1002 include microprocessors, digital signal processors, microcontrollers, and dedicated hardware such as ASICs (Application Specific Integrated Circuits) and FPGAs (Field Programmable Gate Arrays).

Reference has been made in detail to embodiments of the disclosed invention, one or more examples of which have been illustrated in the accompanying figures. Each example has been provided by way of explanation of the present technology, not as a limitation of the present technology. In fact, while the specification has been described in detail with respect to specific embodiments of the invention, it will be appreciated that those skilled in the art, upon attaining an understanding of the foregoing, may readily conceive of alterations to, variations of, and equivalents to these embodiments. For instance, features illustrated or described as part of one embodiment may be used with another embodiment to yield a still further embodiment. Thus, it is intended that the present subject matter covers all such modifications and variations within the scope of the appended claims and their equivalents. These and other modifications and variations to the present invention may be practiced by those of ordinary skill in the art, without departing from the scope of the present invention, which is more particularly set forth in the appended claims. Furthermore, those of ordinary skill in the art will appreciate that the foregoing description is by way of example only, and is not intended to limit the invention.

What is claimed is:

1. A method, comprising:
   subscribing, by a first control module of a network, to a key of a state store of the network, the state store comprising one or more stored data objects and one or more unique keys, each of the stored data objects being associated with one of the one or more unique keys, the key being one of the one or more unique keys;
   generating, by a second control module of the network, a Network Function Virtualization (NFV) policy specification;
   writing, by the second control module, a data object to the state store in association with the key, the data object comprising the NFV policy specification;
   generating a notification associated with the key in response to the data object being written to the state store;
   receiving from the state store, at the first control module, the notification associated with the key;
   reading, by the first control module, the data object from the one or more stored data objects in the state store in response to the notification, the data object being associated with the key; and
   modifying, by the first control module, a network traffic flow of the network through one or more software network functions of the network based on the data object.

2. The method of claim 1, wherein:
   the first control module is a stateless control module.

3. The method of claim 1, wherein modifying the network traffic flow of the network comprises:
   configuring, by the first control module, a software data plane of the network.

4. The method of claim 1, wherein modifying the network traffic flow of the network comprises:
   deploying, by the first control module, the one or more software network functions within the network based on the data object.

5. The method of claim 1, wherein modifying the network traffic flow of the network comprises:
   changing, by the first control module, a configuration of one or more software network functions within the network based on the data object.

6. The method of claim 1, wherein modifying the network traffic flow of the network comprises:
   changing, by the first control module, a configuration of one or more software components within the network.

7. A method, comprising:
   providing a state store within a network, the state store comprising one or more stored data objects and one or more unique keys, each of the stored data objects being associated with one of the unique keys;
   providing a plurality of control modules within the network;
   receiving, at a first control module of the plurality of control modules, a first network function virtualization (NFV) policy specification;
   subscribing, by a second control module of the plurality of control modules, to a first key of the one or more unique keys;
   generating, by the first control module, a second NFV policy specification using the first NFV policy specification;
   writing, by the first control module, a first data object to the state store, the first data object being one of the one or more stored data objects, the first data object comprising the second NFV policy specification, the first data object being stored in the state store in association with the first key;

generating a first notification associated with the first key in response to the first data object being written to the state store; and reading, by the second control module, the first data object from the state store in response to the first notification.

8. The method of claim 7, wherein:

a third control module of the plurality of control modules configures a software data plane of the network.

9. The method of claim 8, wherein:

the software data plane of the network comprises one or more software switches.

10. The method of claim 8, wherein:

the network comprises one or more software network functions, each of the one or more software network functions being communicatively coupled to the software data plane.

11. The method of claim 7, further comprising:

deploying, using one or more control modules of the plurality of control modules, one or more software network functions within the network; and configuring, using a third control module of the plurality of control modules, a software data plane of the network to direct network traffic through the one or more software network functions.

12. The method of claim 7, wherein:

the first NFV policy specification comprises a description of a network function virtualization (NFV) service; and the second NFV policy specification comprises a logical NFV policy specification.

13. The method of claim 7, wherein:

the first NFV policy specification comprises a logical NFV policy specification;

the second NFV policy specification comprises a sized NFV policy specification; and receiving the first NFV policy specification comprises reading, by the first control module, the first NFV policy specification from the state store.

14. The method of claim 7, wherein:

the first NFV policy specification comprises a sized NFV policy specification;

the second NFV policy specification comprises a placed NFV policy specification; and receiving the first NFV policy specification comprises reading, by the first control module, the first NFV policy specification from the state store.

15. The method of claim 7, wherein:

the first NFV policy specification comprises a placed NFV policy specification;

the second NFV policy specification comprises a chained NFV policy specification; and receiving the first NFV policy specification comprises reading, by the first control module, the first NFV policy specification from the state store.

16. The method of claim 7, further comprising:

deploying, by the second control module, one or more software network functions based on the second NFV policy specification; and writing, by the second control module, a second data object to the state store, the second data object comprising data identifying the one or more software network functions, the second data object being associated with a second key of the one or more unique keys; and generating a second notification associated with the second key in response to the second data object being written to the state store.

17. The method of claim 16, further comprising:

reading, by a third control module of the plurality of control modules, the second data object in response to the second notification;

configuring, by the third control module, one or more of the one or more software network functions;

writing, by the third control module, a third data object to the state store, the third data object comprising an indication of a success or failure of the configuring, the third data object being associated with a third key of the one or more unique keys; and generating a third notification associated with the third key in response to the third data object being written to the state store.

18. The method of claim 7, further comprising:

reading, by a third control module, a second data object from the state store, the second data object comprising data identifying one or more components of the network to monitor, the one or more components of the network comprising one or more software network functions of the network;

monitoring, by the third control module, each of the one or more components of the network;

writing, by the third control module, a third data object to the state store, the third data object comprising metrics corresponding to the monitoring of the one or more components of the network, the third data object being associated with a second key of the one or more unique keys; and generating a second notification associated with the second key in response to the third data object being written to the state store.

19. The method of claim 18, further comprising:

reading, by a fourth control module, the third data object from the state store in response to the second notification;

determining, by the fourth control module, using the metrics, that an amount of software network function instances deployed in the network needs to be changed;

generating, by the fourth control module, a third NFV policy specification;

writing, by the fourth control module, a fourth data object to the state store, the fourth data object comprising the third NFV policy specification, the fourth data object being associated with the first key; and generating a third notification associated with the first key in response to the fourth data object being written to the state store.

20. The method of claim 18, further comprising:

reading, by a fourth control module, the third data object from the state store in response to the second notification;

determining, by the fourth control module, using the metrics, that a component of the one or more components of the network has experienced an error;

generating, by the fourth control module, a third NFV policy specification;

writing, by the fourth control module, a fourth data object to the state store, the fourth data object comprising the third NFV policy specification, the fourth data object being associated with the first key; and generating a third notification associated with the first key in response to the fourth data object being written to the state store.

21. The method of claim 7, wherein:

each control module of the plurality of control modules is implemented as a separate independent software entity.

22. The method of claim 7, wherein:
the first control module is deployed in a first virtual machine at a compute node of the network; and
the second control module is deployed at a component of the network, the component being the compute node, another compute node, a second virtual machine, a container, an ASIC, or an FPGA.

23. The method of claim 7, wherein:
the first control module is deployed in a first container at a compute node of the network; and
the second control module is deployed at a component of the network, the component being the compute node, another compute node, a virtual machine, a second container, an ASIC, or an FPGA.

24. The method of claim 7, wherein:
the first control module is deployed at a first compute node of the network; and
the state store is deployed at a second compute node of the network.

25. The method of claim 7, further comprising:
subscribing, by the second control module, to a second key of the one or more unique keys;
generating, at a third control module, a third NFV policy specification, the third NFV policy specification and the second NFV policy specification being of a same type of NFV policy specification;
writing, from the third control module, a second data object to the state store, the second data object comprising the third NFV policy specification, the second data object being associated with the second key;
generating a second notification associated with the second key in response to the second data object being written to the state store; and
reading, by the second control module, the second data object from the state store in response to the second notification.

26. The method of claim 7, further comprising:
providing a third control module in the network, the third control module having an initial state that does not correspond to a current state of the network;
reading, by the third control module, one or more data objects from the state store, the one or more data objects corresponding to the current state of the network; and
updating, at the third control module, the initial state using the one or more data objects, the updated initial state corresponding to the current state of the network.

27. The method of claim 7, wherein:
communication of the one or more stored data objects between the plurality of control modules is exclusively through the state store.

* * * * *